United States Patent
Lingelbach et al.

(10) Patent No.: US 12,462,269 B1
(45) Date of Patent: Nov. 4, 2025

(54) CURRENT STORE FOOT-TRAFFIC PRODUCT PRICING SYSTEM AND RELATED METHODS

(71) Applicant: Inmar Clearing, Inc., Winston-Salem, NC (US)

(72) Inventors: Mark B. Lingelbach, Winston-Salem, NC (US); Sharad Acharya, Raleigh, NC (US); Nirajan Kharal, Columbia, MO (US); Justin A. Krull, Burgettstown, PA (US); George Peterson, Winston-Salem, NC (US)

(73) Assignee: INMAR CLEARING, INC., Winston-Salem, NC (US)

( * ) Notice: Subject to any disclaimer, the term of this patent is extended or adjusted under 35 U.S.C. 154(b) by 0 days.

(21) Appl. No.: 18/444,582

(22) Filed: Feb. 16, 2024

(51) Int. Cl.
 *G06Q 30/0201* (2023.01)
 *G06Q 10/087* (2023.01)
 *G06Q 30/0601* (2023.01)

(52) U.S. Cl.
 CPC ....... *G06Q 30/0206* (2013.01); *G06Q 10/087* (2013.01); *G06Q 30/0639* (2013.01); *G06Q 30/0641* (2013.01)

(58) Field of Classification Search
 CPC ............. G06Q 30/0206; G06Q 10/087; G06Q 30/0639; G06Q 30/0641
 See application file for complete search history.

(56) References Cited

U.S. PATENT DOCUMENTS

| | | | | |
|---|---|---|---|---|
| 6,703,934 B1* | 3/2004 | Nijman | ................ | G08B 13/246 |
| | | | | 235/383 |
| 7,894,936 B2 | 2/2011 | Walker et al. | | |
| 11,195,193 B2 | 12/2021 | Liu et al. | | |
| 11,580,514 B1* | 2/2023 | Whiteley | .............. | G06F 3/0482 |
| 11,676,169 B1 | 6/2023 | Bhow et al. | | |
| 11,963,062 B1* | 4/2024 | Fix | ........................ | H04W 4/021 |
| 2003/0065805 A1 | 4/2003 | Barnes, Jr. | | |
| 2005/0060062 A1* | 3/2005 | Walker | ................. | G06Q 10/087 |
| | | | | 705/400 |

(Continued)

OTHER PUBLICATIONS

Chu et al., Partial Refunds or money-back Guarantees, Seoul Journal of Business, vol. 4, No. 1, Jun. 1998, pp. 35-52.

(Continued)

*Primary Examiner* — Michael P Harrington
*Assistant Examiner* — Brian A Tallman
(74) *Attorney, Agent, or Firm* — ALLEN, DYER, DOPPELT, + GILCHRIST, P.A.

(57) ABSTRACT

A product pricing system may include at least one shopper device associated with a respective shopper and a product pricing server. The server may be configured to obtain geographic location data from the at least one shopper device and determine current store foot-traffic associated with a store at a given time based upon the geographic location data. The server may also be configured to adjust a current price of a given product for purchase at the store based upon the current store foot-traffic and cooperate with the at least one shopper device to display the adjusted current price of the given product for purchase at the store. The server may also be configured to lock the adjusted current price of the given product for purchase from further adjustment for a threshold time period based upon a selection input to the at least one shopper device.

20 Claims, 16 Drawing Sheets

(56) References Cited

U.S. PATENT DOCUMENTS

| | | |
|---|---|---|
| 2007/0214057 A1 | 9/2007 | Lee et al. |
| 2008/0208663 A1* | 8/2008 | Walker .............. G06Q 30/0222 |
| | | 705/14.46 |
| 2012/0095805 A1* | 4/2012 | Ghosh ............... G06Q 30/0201 |
| | | 705/7.29 |
| 2014/0006219 A1 | 1/2014 | Wouhaybi et al. |
| 2014/0344051 A1 | 11/2014 | Ouimet |
| 2015/0112790 A1* | 4/2015 | Wolinsky ........... G06Q 20/3274 |
| | | 705/14.38 |
| 2016/0180363 A1 | 6/2016 | Burkhart et al. |
| 2018/0114257 A1 | 4/2018 | Conville et al. |
| 2018/0144357 A1 | 5/2018 | Nayak et al. |
| 2018/0213357 A1* | 7/2018 | Richter ............ G06F 16/24578 |
| 2018/0331851 A1* | 11/2018 | Hobbs .................. H04L 69/324 |
| 2018/0365725 A1 | 12/2018 | Smith et al. |
| 2019/0272557 A1 | 9/2019 | Smith et al. |
| 2019/0318396 A1* | 10/2019 | Shah ....................... H04W 4/35 |
| 2020/0342475 A1 | 10/2020 | Wu et al. |
| 2021/0073882 A1 | 3/2021 | Park |
| 2021/0224835 A1 | 7/2021 | Mehrotra et al. |
| 2021/0235224 A1* | 7/2021 | MacDonald-Korth ..................... G06Q 30/0261 |
| 2021/0357895 A1* | 11/2021 | Hwang ..................... A47F 5/00 |
| 2023/0419201 A1* | 12/2023 | Pachigar .............. G06Q 10/063 |

OTHER PUBLICATIONS

Zheng, et al. "Analysis of product return rate and price competition in two supply chains", Operation Research Int J, Jul. 2018, pp. 1-19.

Saha et al., "Location determination of a mobile device using IEEE802.11 access point signals", May 2002, pp. 1-20.

Peterson et al., "Location-based advertising-the key to unlocking the most value in the mobile advertising and location-based services markets", Peterson Mobility Solutions, Dec. 2009, pp. 1-29.

Grewal et al., "Innovations in retail pricing and promotions", Elsevier, Journal of Retailing, 2011, pp. s43-s52.

* cited by examiner

CURRENT STORE FOOT-TRAFFIC PRODUCT PRICING SYSTEM AND RELATED METHODS

TECHNICAL FIELD

The present invention relates to the field of pricing, and, more particularly, to product pricing systems and related methods.

BACKGROUND

A given product may sell at a given rate, for example, determined based upon market research. A manufacturer, for example, may produce a given number of products for a given time period, while a given retailer may purchase or stock a given number of the products based upon demand at that retailer or store. Typically, the production and purchase for sale by a retailer are timed to meet demand.

External events, such as, for example, weather, supply chain disruptions, time of day, and time of year may influence product supply. Retailer geographic location may also influence product supply. For example, a retailer near an urban location or main highway may experience higher foot traffic that a retailer location in a more rural area.

For a retail location having higher foot traffic, products may be sold quicker, and thus supplies may be lower at any given time. In other words, oftentimes, a given product may be sold out or unavailable at a retailer, for example, because the consumer demand exceeds the supply, either purchased by the retailer or produced by the manufacturer. In these cases, whatever supply that may exist may have an increased sales price.

In contrast, a retail location with lower foot traffic may sell products more slowly, and it may be possible that some products be discarded as reaching their desired sell-by date. In these cases, prior to discarding or reaching the desired sell-by date, whatever supply that may exist may have a decreased sales price.

U.S. Pat. No. 7,894,936 to Walker et al. discloses an apparatus that determines a current price of a product for sale by the vending machine. It then determines, for the product, a price increment, a predetermined price, and a demand threshold, that are defined by data stored in at least one data table. A rate of units of the product that are sold are determined. The rate is compared with the demand threshold. Based on the comparison of the rate with the demand data, it is determined whether the new price should be greater than or less than the current price. The new price is set to the predetermined price if the new price should be greater than the current price. If the new price should be less than the current price, a price increment amount is subtracted from the current price to yield the new price. The determined new price is displayed.

U.S. Pat. No. 11,195,193 to Liu et al. is directed to a system for price testing and optimization. More particularly, the system obtains pricing of competitors' products from the web. Pricing may be adjusted based upon the pricing of the competitors' products along with other factors associated with a given shopper.

SUMMARY

A product pricing system may include at least one shopper device associated with a respective shopper and a product pricing server. The server may be configured to obtain geographic location data from the at least one shopper device and determine current store foot-traffic associated with a store at a given time based upon the geographic location data. The server may also be configured to adjust a current price of a given product for purchase at the store based upon the current store foot-traffic and cooperate with the at least one shopper device to display the adjusted current price of the given product for purchase at the store. The server may also be configured to lock the adjusted current price of the given product for purchase from further adjustment for a threshold time period based upon a selection input to the at least one shopper device.

The product pricing server may be configured to generate a digital promotion for redemption toward a purchase at the store and communicate the digital promotion to the shopper device for display thereat, for example. The threshold time period may include at least one of a timed duration from the selection input to the at least one shopper device, a time until completion of purchase of the given product at a point-of-sale (POS) device at the store, and a time until the at least one shopper device is no longer in the given store, for example.

The product pricing server may be configured to cooperate with a point-of-sale (POS) device at the store to determine purchase transactions per given time period at the store, and determine the current store foot-traffic based upon the purchase transactions per given time period. The product pricing server may be configured to cooperate with a point-of-sale (POS) device at the store to determine a number of products per purchase transaction at the store, and determine the current store foot-traffic based upon the number of products per purchase transaction.

The product pricing server may be configured to adjust the current price of the given product higher based upon a higher current store foot-traffic, and adjust the current price of the given product lower based upon a lower current store foot-traffic, for example. The product pricing server may be configured to operate a machine learning algorithm that learns foot-traffic trends and generates as output therefrom, predicted foot-traffic, and adjust the current price of the given product based upon the predicted foot-traffic.

The least one shopper device may include a plurality of shopper devices each associated with a respective shopper. The product pricing server may be configured to obtain geographic location data from each of the plurality of shopper devices and determine the current store-traffic based upon the shopper location data from each of the plurality of shopper devices, for example.

The store may have at least one network access point therein for communicating with the at least one shopper device. The geographic location data may include data communicated between the at least one network access point and the at least one shopper device. The product pricing server may be configured to determine the current store foot-traffic based upon the communication between the at least one shopper device and the at least one network access point, for example.

The at least one shopper device may include a geographic position determining device. The geographic location data may include geographic position coordinate data. The product pricing server may be configured to determine the current store foot-traffic based upon the geographic position coordinate data, for example.

The product pricing server may be configured to obtain further geographic location data from at least one other shopper device. The product pricing server may be configured to determine current store foot-traffic associated with another store based upon the further geographic location data, and adjust the current price of the given product for purchase at the store based upon the current store foot-traffic associated with the another store, for example.

A method aspect is directed to a method of pricing a product. The method may include using a product pricing server to obtain geographic location data from at least one shopper device associated with a respective shopper and determine current store foot-traffic associated with a store at a given time based upon the geographic location data. The method may also include using the product pricing server to adjust a current price of a given product for purchase at the store based upon the current store foot-traffic and cooperate with the at least one shopper device to display the adjusted current price of the given product for purchase at the store. The method may also include using the product pricing server to lock the adjusted current price of the given product for purchase from further adjustment for a threshold time period based upon a selection input to the at least one shopper device.

A computer readable medium aspect is directed to a non-transitory computer readable medium for pricing a product. The non-transitory computer readable medium includes computer executable instructions that when executed by a processor cause the processor to perform operations. The operations may include obtaining geographic location data from at least one shopper device associated with a respective shopper and determining current store foot-traffic associated with a store at a given time based upon the geographic location data. The operations may also include adjusting a current price of a given product for purchase at the store based upon the current store foot-traffic and cooperating with the at least one shopper device to display the adjusted current price of the given product for purchase at the store. The operations may further include locking the adjusted current price of the given product for purchase from further adjustment for a threshold time period based upon a selection input to the at least one shopper device.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime and multiple prime notations and numbers in increments of 100 are used to indicate similar elements in alternative embodiments.

Figure 1:
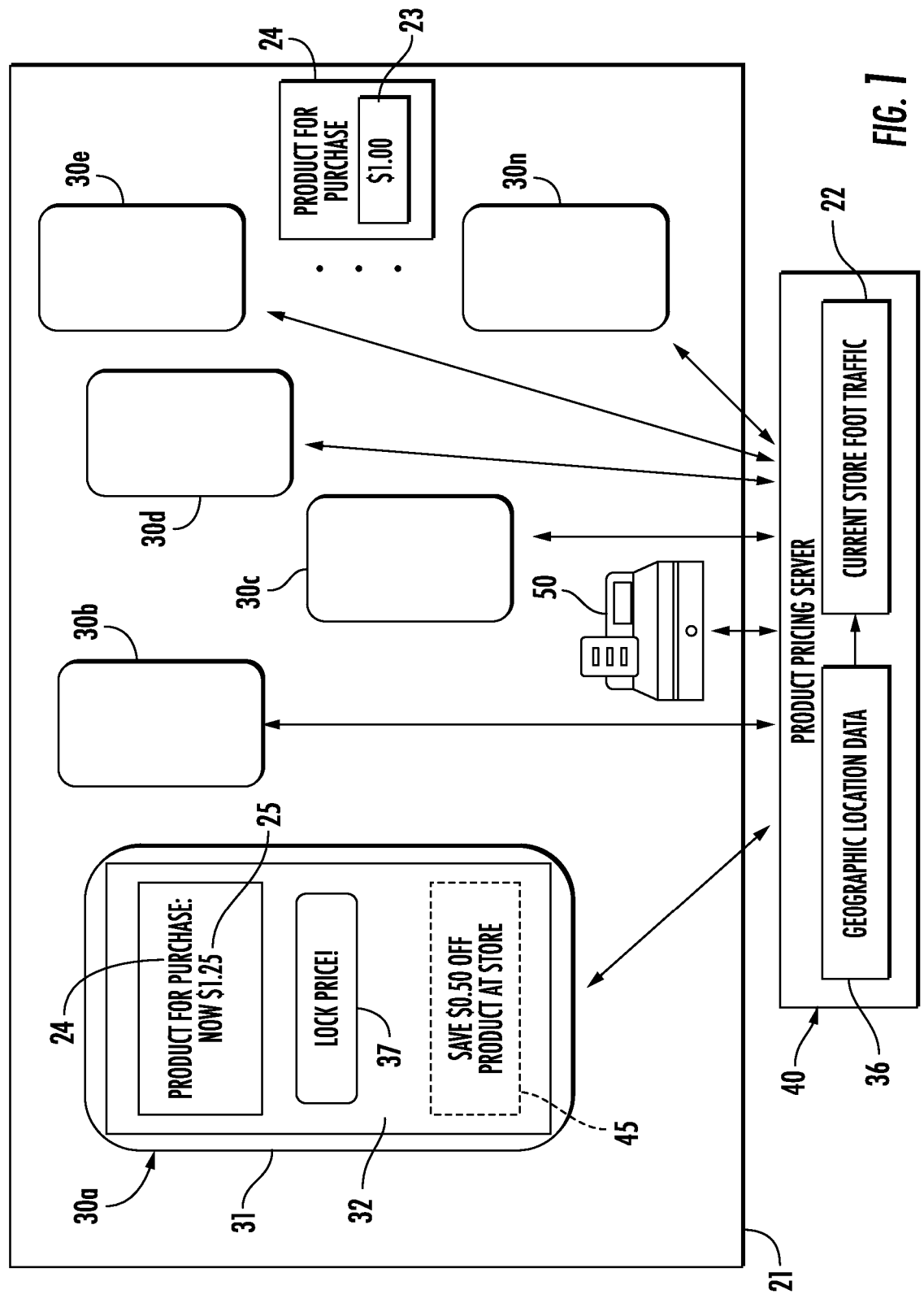
FIG. 1 is a schematic diagram of a product pricing system according to an embodiment.
Figure 2:
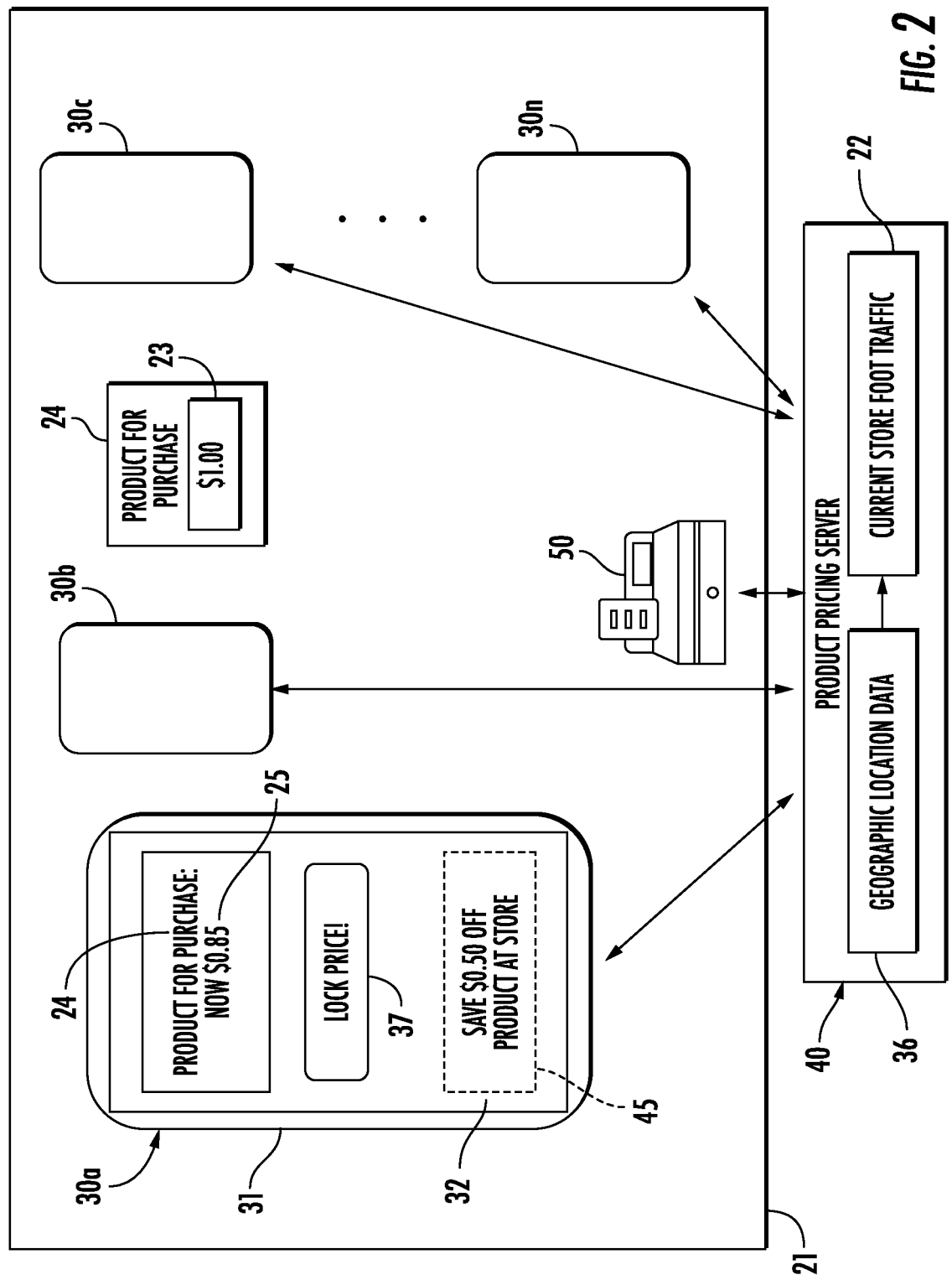
FIG. 2 is another schematic diagram of the product pricing system of FIG. 1.
Figure 3:
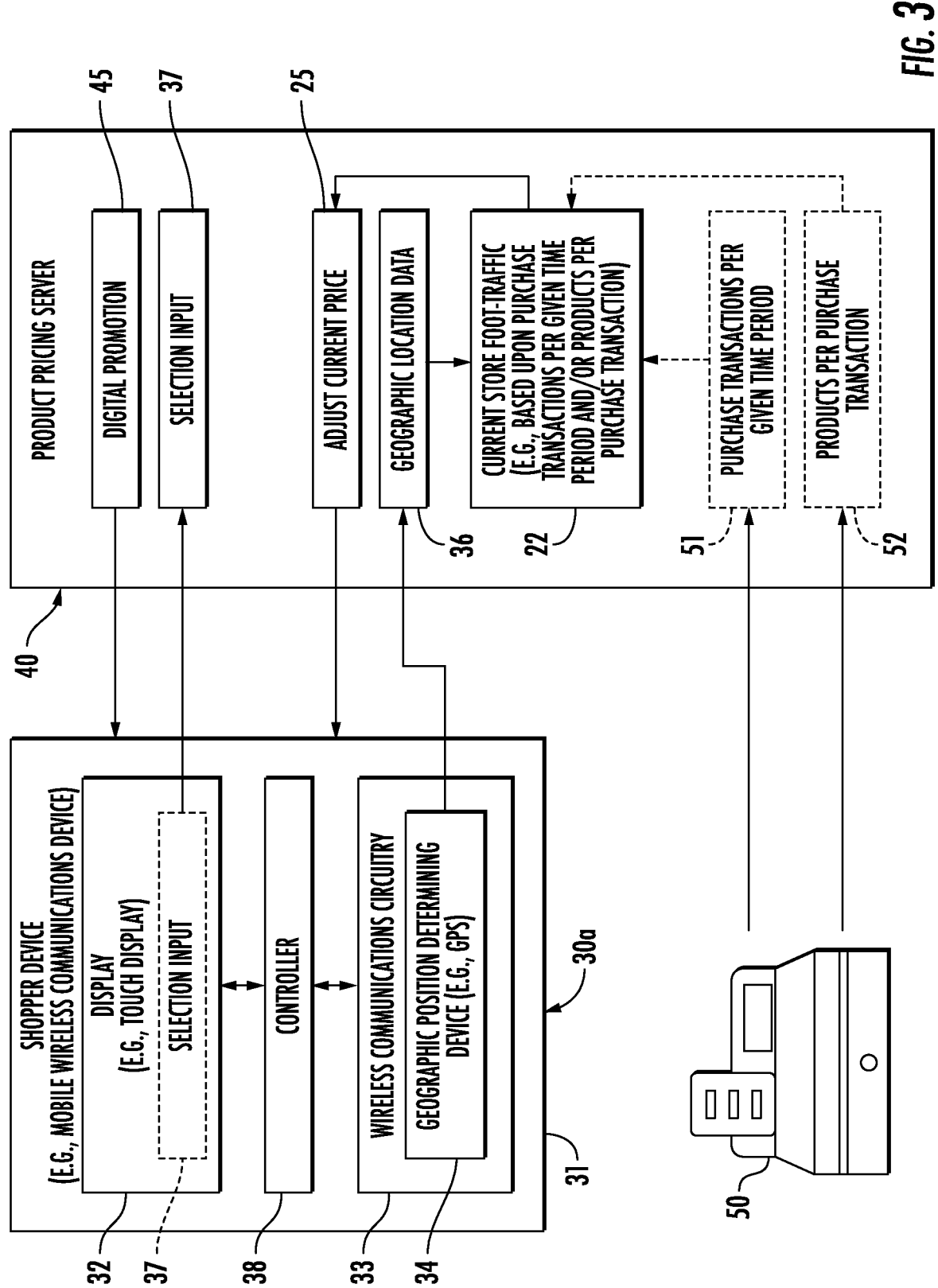
FIG. 3 is a schematic block operational diagram of the product pricing system of FIG. 1.

Referring initially to FIGS. 1-3, a product pricing system 20 includes shopper devices 30a-30n. Each shopper device 30a-30n is associated with a respective shopper. The shopper devices 30a-30n are illustratively in the form of a mobile wireless communications device, and more particularly, a mobile or smart phone. One or more of the shopper devices 30a-30n may be a different type of wireless communications device, for example, a wearable device, a tablet computer, or a laptop computer.

Each shopper device 30a-30n may include a display 32 carried by a housing 31. The display 32 may be in the form of a touch display, for example, that, while displaying information, accepts user input. Each shopper device 30a-30n may also include wireless communications circuitry 33 carried by the housing 31. The wireless communications circuitry 33 may include one or more of long-range wireless communications circuitry (e.g., cellular, satellite or global positioning system (GPS)), medium-range wireless communications circuitry (e.g., Wifi, Bluetooth), and/or short-range wireless communications circuitry (e.g., near-field communications (NFC)). A controller 38 may cooperate with the display 32 and the wireless communications circuitry 33 to perform display and wireless communications functions, respectively.

Figure 4:
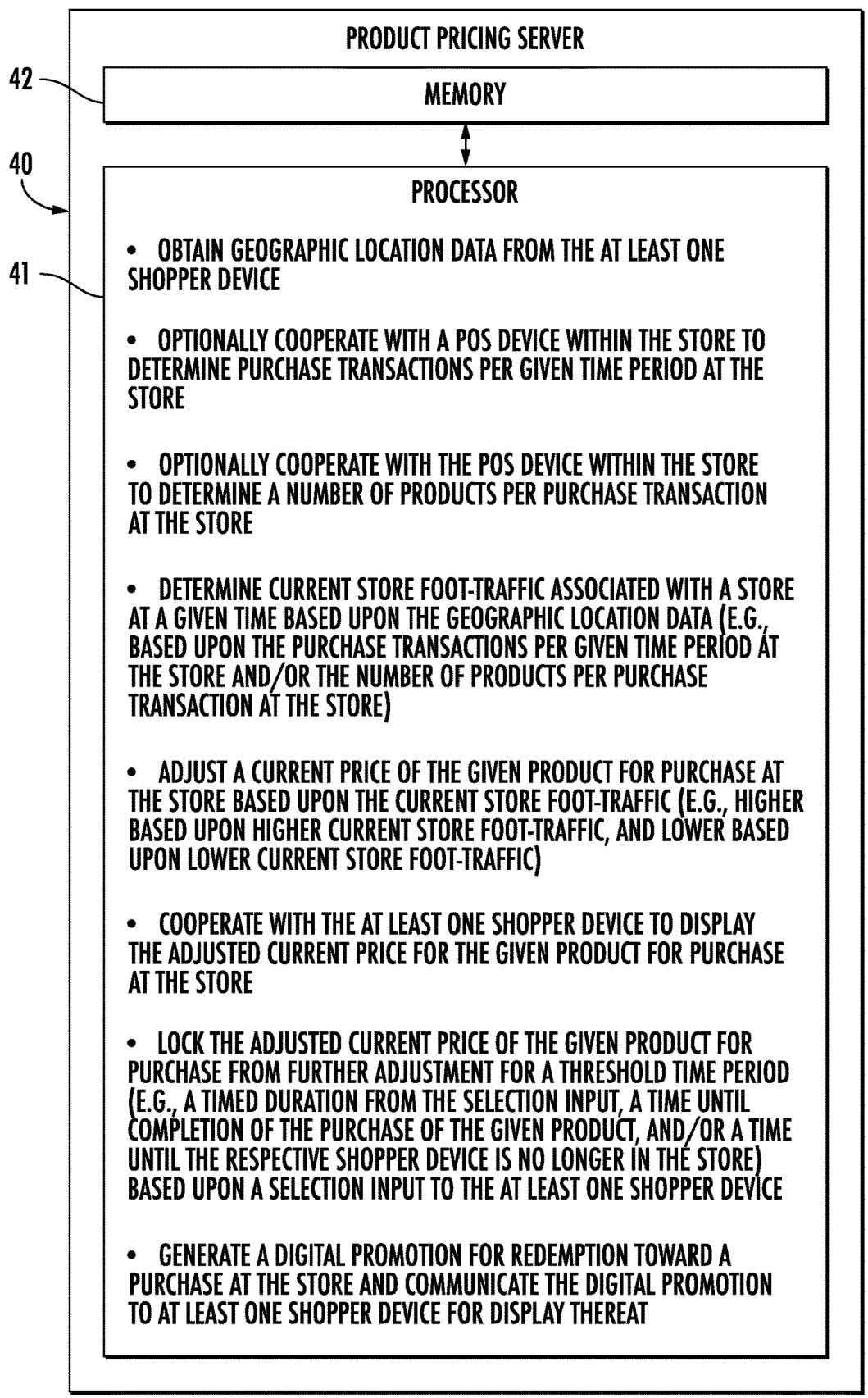
FIG. 4 is a schematic block diagram of the product pricing server of FIG. 3.

Referring additionally to FIG. 4, the product pricing system 20 also includes a product pricing server 40. The product pricing server 40 includes a processor 41 and an associated memory 42. The operations of the product pricing server 40 are described herein, the processor 41 and the memory 42 cooperate to perform the operations.

Figure 5:
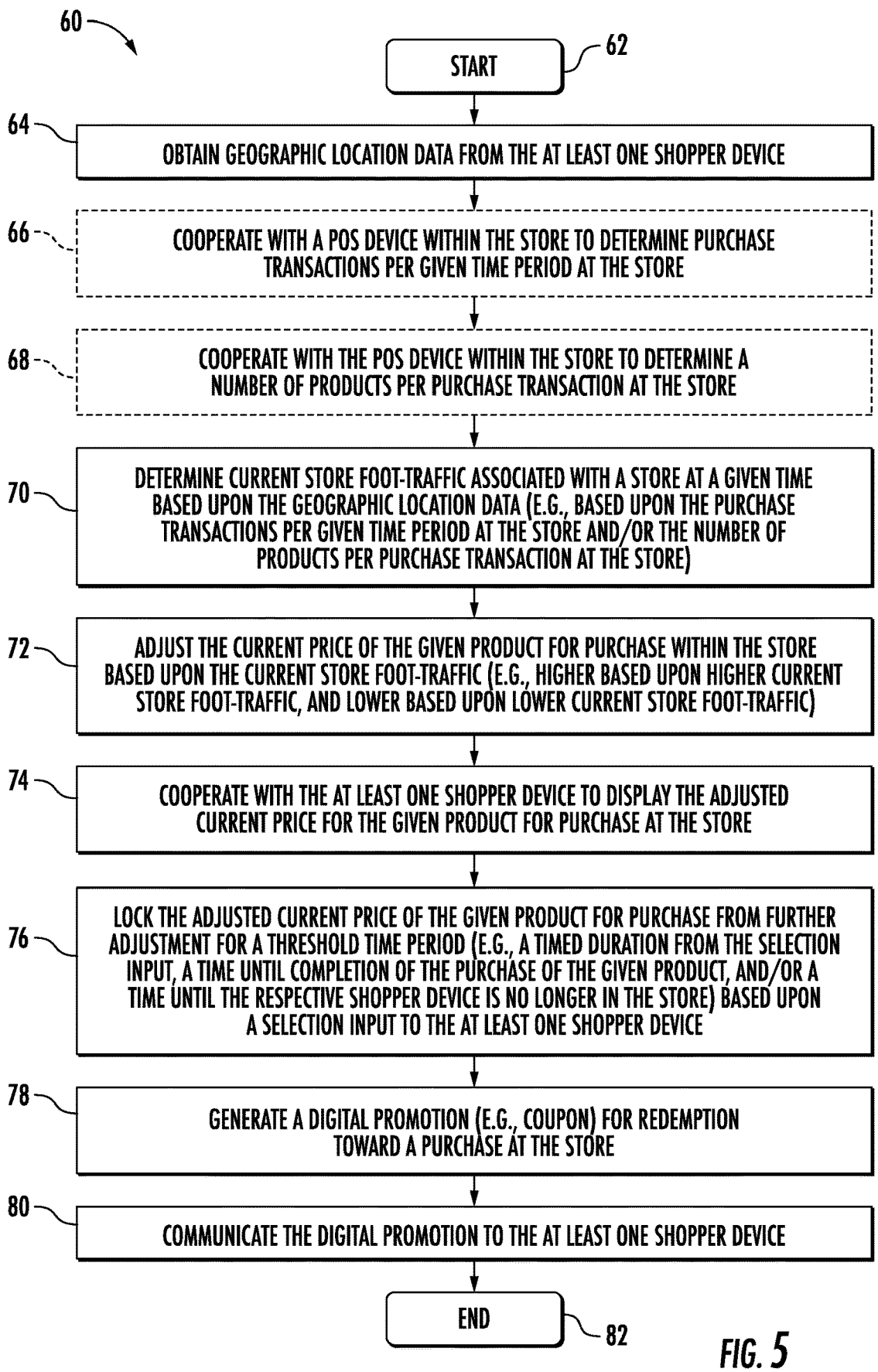
FIG. 5 is a flow diagram illustrating operation of the product pricing server of FIG. 4.

Referring now additionally to the flowchart 60 in FIG. 5, beginning at Block 62, operations of the product pricing server 40 will now be described. At Block 64, the product pricing server 40 obtains geographic location data 36 from the shopper devices 30a-30n. More particularly, the shopper devices 30a-30n may include a geographic position determining device 34, for example, a GPS receiver that may be part of the wireless communications circuitry 33. Accordingly, the product pricing server 40 may cooperate with each shopper device 30a-30n, e.g., via the wireless communications circuitry 33, to obtain geographic position data 36 (e.g., geographic position coordinate data, GPS coordinates) therefrom. Shopper devices 30a-30n may be identified by respective device identifiers, as will be appreciated by those skilled in the art. The product pricing server 40 processes the geographic position data 36 by comparing the GPS coordinates to a known coordinate system to obtain the current geographic locations of each of the shopper devices 30a-30n. The geographic locations are compared to a geographic location of a store 21, for example, where the shopper may purchase products. If the geographic location of a given shopper device 30a-30n matches, for example, to within a threshold distance of the store 21, the shopper is determined to be at the store.

In instances where a given shopper device 30a-30n is determined to be within a threshold distance of the store 21 (e.g., 100 feet), and subsequently, the product pricing server 40 loses communication or receives null or unreliable geographic position data 36 (e.g., loss of clock synchronization, GPS lock, or less than a threshold number of satellites), the product pricing server may determine that the given shopper device is at the store 21. Those skilled in the art will appreciate that if the given shopper enters the store, the given shopper device 30a-30n may lose line-of-sight with one or more GPS satellites, which may, in turn, cause loss of clock synchronization or GPS lock, and/or communication with less than a desired number of satellites for accurate position determining. Should this occur in relatively close proximity to the store 21, the product pricing server 40 may determine or conclude that the given shopper has entered the store.

Figure 6:
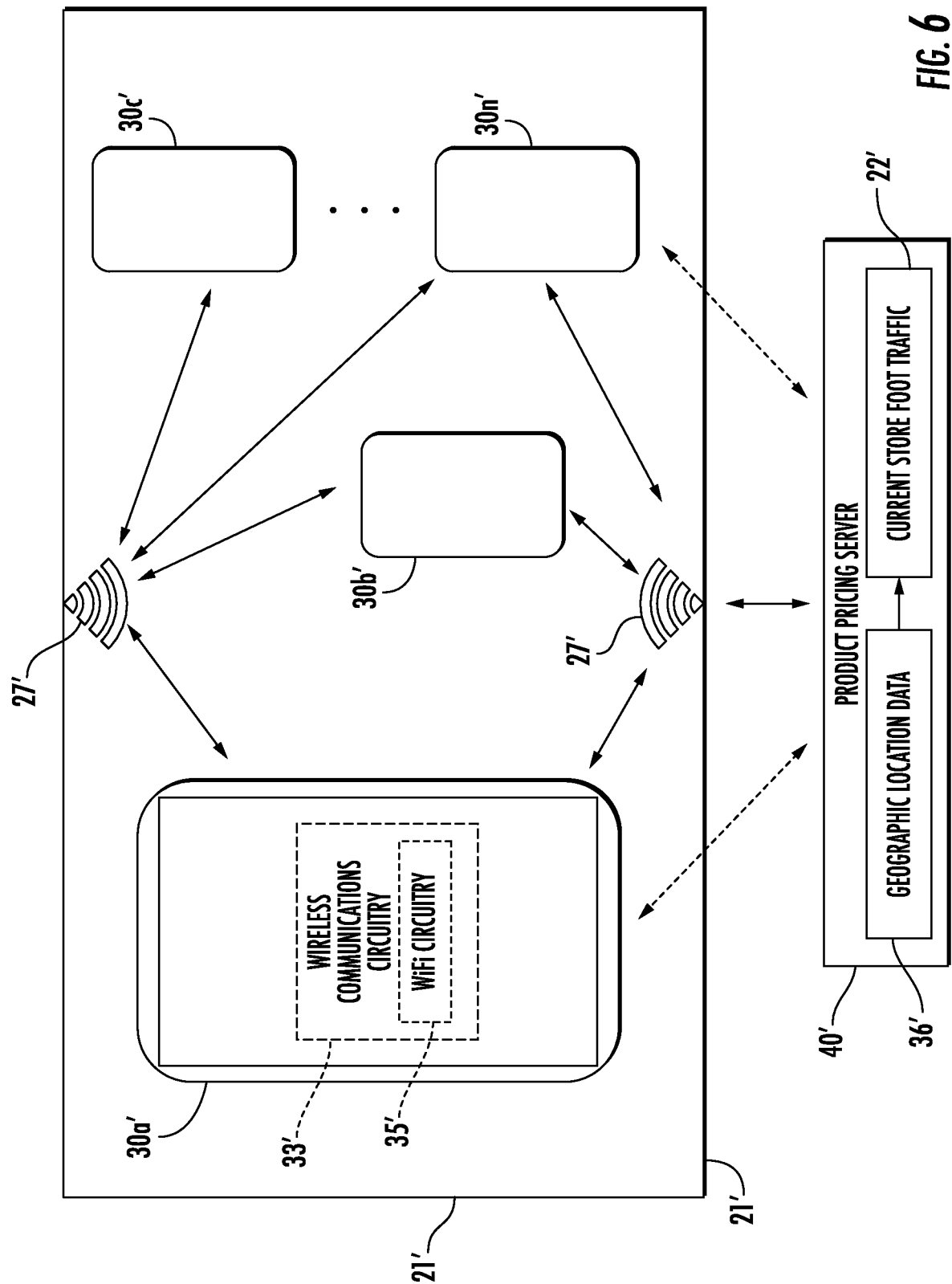
FIG. 6 is a schematic diagram of a product pricing system in accordance with another embodiment.

Referring briefly to FIG. 6, in another embodiment, the store 21' may have one or more network access points 27' therein, for example, WiFi or wireless access points. The shopper devices 30a'-30n' may communicate with the product pricing server 40' via the network access points 27' using WiFi circuitry 35', which may be part of the wireless communications circuitry 33' of the shopper devices. Data communicated between the network access points 27' and the shopper devices 30a'-30n' may define the geographic location data 36'. For example, the data communicated may include embedded information to identify the source of the communications, such as, for example, an internet protocol (IP) address. More particularly, a source IP address may be associated with the store 21' or the network access point 27' such that the location of the shopper device may be known. In other words, the product pricing server 40' may determine the location based upon the IP address. Other identifiers may be used to determine the location, for example, a media access control (MAC) address associated with the network access point 27'. As will be appreciated by those skilled in the art, a MAC address is a unique identifier assigned to a network interface appliance, such as, for example, the network access point 27', for use as a network address in network communications.

While exemplary techniques for determining the location of the shopper devices 30a-30n within the store 21 have been described, other techniques may be used, either alone or in conjunction with those described herein. For example, in some embodiments, the store 21 may include NFC or radio-frequency identification (RFID) tags spaced around the store. Communication with those tags may serve as a basis for determining whether a shopper device is within the store, for example, using IP or MAC addresses, as described above. Moreover, the product pricing server 40 may determine whether shopper devices 30a-30n are within the store 21 based upon both GPS and WiFi (or NFC/RFID). For example, if the geographic location data 36 is indicative of a relatively close proximity to the store 21, followed by communication with an access point, then the product pricing server 40 may determine (e.g., with relative certainty) that the shopper is at the store.

The product pricing server 40, at Block 70, determines current store foot-traffic 22 associated with the store 21. The product pricing server 40, based upon the geographic location or geographic position data 36, determines how may shopper devices 30a-30n are in the store, and thus how many shoppers are in the store. The amount of shoppers in the store 21 may be indicative of the current foot-traffic 22. As shopper devices 30a-30n and associated shoppers enter and leave the store 21, the current store foot-traffic 22 increases and decreases, respectively. Current store foot-traffic 22 may be determined periodically, for example, every minute, based upon obtaining the geographic location or position data 36 at a similar in lesser interval (e.g., every minute or less). Current store foot-traffic 22 may be determined in real-time or at variable intervals, for example, increasing a rate of determination based upon historical store foot-traffic, particularly when there are relatively rapid changes in foot-traffic.

The product pricing server 40 may determine current store foot-traffic 22 based upon other and/or additional data. In other words, current store foot-traffic 22 may not be based purely upon a number of shoppers in the store 21 at any given time.

For example, the product pricing server 40 may cooperate with a point-of-sale (POS) device 50 within the store 21 to determine purchase transactions per given time period 51 at the store (Block 66). The product pricing server 40 may receive transaction data from the POS device 50, for example, as purchase transactions are being processed. The product pricing server 40 may count a number of purchase transactions in a given hour, for example. A higher number of purchase transactions per the given time period (e.g., hour) may be indicative of relatively high turnover within the store 21. In other words, a higher number of shoppers are coming into and leaving the store 21. This may be in contrast to a lower number of purchase transactions per the given time period for a same number of shoppers within the store 21, which may be indicative that the shoppers within the store are spending more time within the store (i.e., dwell time). The given time period may be another or any time period, and the product pricing server 40 may receive purchase transaction data from more than one POS device 50 at the store 21. Accordingly, the current store foot-traffic 22 may also be based upon the purchase transactions per the given time period 51.

In another exemplary implementation, the product pricing server 40 may cooperate with the point-of-sale (POS) device 50 within the store 21 to determine a number of products per purchase transaction 52 at the store 21. (Block 68). The product pricing server 40 may receive transaction data from the POS device 50, for example, as purchase transactions are being processed, which may include the number of products per purchase transaction 52. The product pricing server 40 may calculate, for example, an average number of products per purchase transaction, which may be over a given time period. A higher number of products per purchase transaction 52 may be indicative that shoppers are spending more time in the store 21. In other words, a shopper having twenty products in a given purchase transaction likely spent more time in the store 21 than a shopper that purchased two products in a given purchase transaction. A higher number or products per purchase transaction 52 may correspond to higher current store foot-traffic 22, for example, as shoppers are spending longer within the store 21 moving about the aisles. In other words, a shopper with a higher number or products in a given purchase transaction likely navigated more store area than the shopper that purchased only a few products in the given purchase transaction. Accordingly, the current store foot-traffic 22 may be based upon, alternatively or additionally (e.g., with the purchase transactions per given time period 51), the number of products per purchase transaction 52.

Referring again briefly to FIG. 6, the current store foot-traffic 22' may alternatively or additionally be determined based upon communication between the shopper devices 30a'-30n' and the network access points 27'. Similarly to the embodiments determining current store foot-traffic 22' based upon geographic location data 36', the product pricing server 40' determines how may shopper devices 30a'-30n' are in the store 21', and thus how many shoppers are in the store. The amount of shoppers in the store 21' may be indicative of the current foot-traffic 22'.

At Block 72, the product pricing server 40 adjusts a current price 23 of a given product for purchase 24 within the store 21 based upon the current store foot-traffic 22. The product pricing server 40 may adjust the current price 23 of the given product for purchase 24 higher based upon higher current store foot-traffic 22 (FIG. 1). The product pricing server 40 may adjust the current price 23 of the given product for purchase 24 lower based upon lower current store foot-traffic 22 (FIG. 2). For example, a given product for purchase 24 has a current price 23 of $1.00. During periods of higher current store foot-traffic 22, the product pricing server 40 may increase the current price 23 to an adjusted price 25 of $1.25 (FIG. 1), for example. During periods of lower current store foot-traffic 22, the product pricing server 40 may decrease the current price 23 to an adjusted price 25 of $0.85 (FIG. 2), for example. The amount of the increase or decrease in the current price 23 may be dependent on the current store foot-traffic 22, for example, how much the current store foot-traffic is deviating from an average or normalized store foot-traffic for the given time and/or time period (e.g., purchase transaction counts, item counts, shoppers in store).

The product pricing server 40, at Block 74, cooperates with one or more of the shopper devices 30a-30n to display, for example, on the display 32, the adjusted current price 25 of the given product for purchase 24. The adjusted current price 25 may be communicated via an application executed on a given shopper device 30a-30n, for example, and associated with the store. The given product for purchase 24 may be a promoted product for purchase, for example, a product the shopper has previously purchased, or a product the shopper has saved to a list (e.g., in the application associated with the store).

In some embodiments, beacon technologies, for example, using NFC, may permit the product pricing server 40 to determine when a given shopper, via the respective shopper device 30a-30n is in proximity to the given product for purchase 24, and cooperate to display the adjusted current price 25 based upon the detected proximity. In an embodiment, the shopper may, for example, via the application, scan the given product for purchase 24 for purposes of a price-check or adding to a virtual cart for use in a self-checkout process, for example. The product pricing server 40 may thus cooperate the respective shopper device 30a-30n to display the adjusted current price 25 thereat, for example, based upon the scanning or price checking.

The product pricing server 40, may cooperate with the shopper devices 30a-30n to display, on the display 32, along with the adjusted current price 25, a selection input 37. The selection input 37 may, upon activation or touch thereto, be indicative of the shopper's desire to purchase the given product for purchase 24 at the adjusted current price 25. The selection input 37 may add the given product for purchase 24 to a virtual shopping cart for self-checkout, or may lock the adjusted current price. For example, if the adjusted current price 25 is lower, it may be desirable to lock the lower price. Alternatively, if the adjusted current price 25 is higher, it may also be desirable to lock the higher price to prevent additional price increases. Locking the adjusted current price 25 is described in further detail below.

At Block 76, the product pricing server 40, for example, in response to the selection input 37, locks the adjusted current price 25 from further pricing adjustment for a threshold time period. The threshold time period may include a timed duration from the selection input 37 to the respective shopper device 30a-30n. For example, a given shopper may have 15-minutes from the selection input 37 until the locked adjusted current price 25 unlocks. The threshold time period may include a time until completion of the purchase of the given product 24 at the POS device 50. For example, the given shopper may have 15-minutes from the selection input 37 to the respective shopper device, or may be given a time of day by which to complete the purchase of the given product 24 (e.g., by processing payment at the POS device 50 in the store 21) until the locked adjusted price 25 unlocks. Alternatively or additionally, the threshold time period may include a time until the respective shopper device 30a-30n is no longer in the store 21, for example, using one of the techniques described above. In other words, once the given shopper leaves the store 21, the locked adjusted current price 25 may be unlocked.

The product pricing server 40 may generate a digital promotion 45 (Block 78). The digital promotion 45 may be a digital coupon, for example, and be redeemable toward a purchase at the store 21. The digital promotion 45 may be redeemable toward a specific product for purchase or brand of product, which may or may not be the same product and/or brand as the given product for purchase 24 having the adjusted current price 25 locked. The digital promotion 45 may be redeemable, for example, toward a purchase of a competitor branded product to the given product for purchase 24. At Block 80, the product pricing server 40 communicates the digital promotion 45 to one or more of the shopper devices 30a-30n. The product pricing server may generate and communicate the digital promotion 45 based upon the selection input 37 so that shoppers who have locked an adjusted current price 25 receive the digital promotion. In some embodiments, the product pricing server 40 may generate and communicate the digital promotion regardless the selection input 37 so that shoppers may receive a digital promotion even if they did not lock the adjusted current price 25. In some embodiments, the product pricing server 40 may generate and communicate the digital promotion 45 based upon display of the adjusted current price 25. For example, if the adjusted current price 25 is displayed, but no selection input 27 is received (e.g., within a threshold time period), the product pricing server 40 may generate and communicate the digital promotion 45. Operations end at Block 82.

Figure 7:
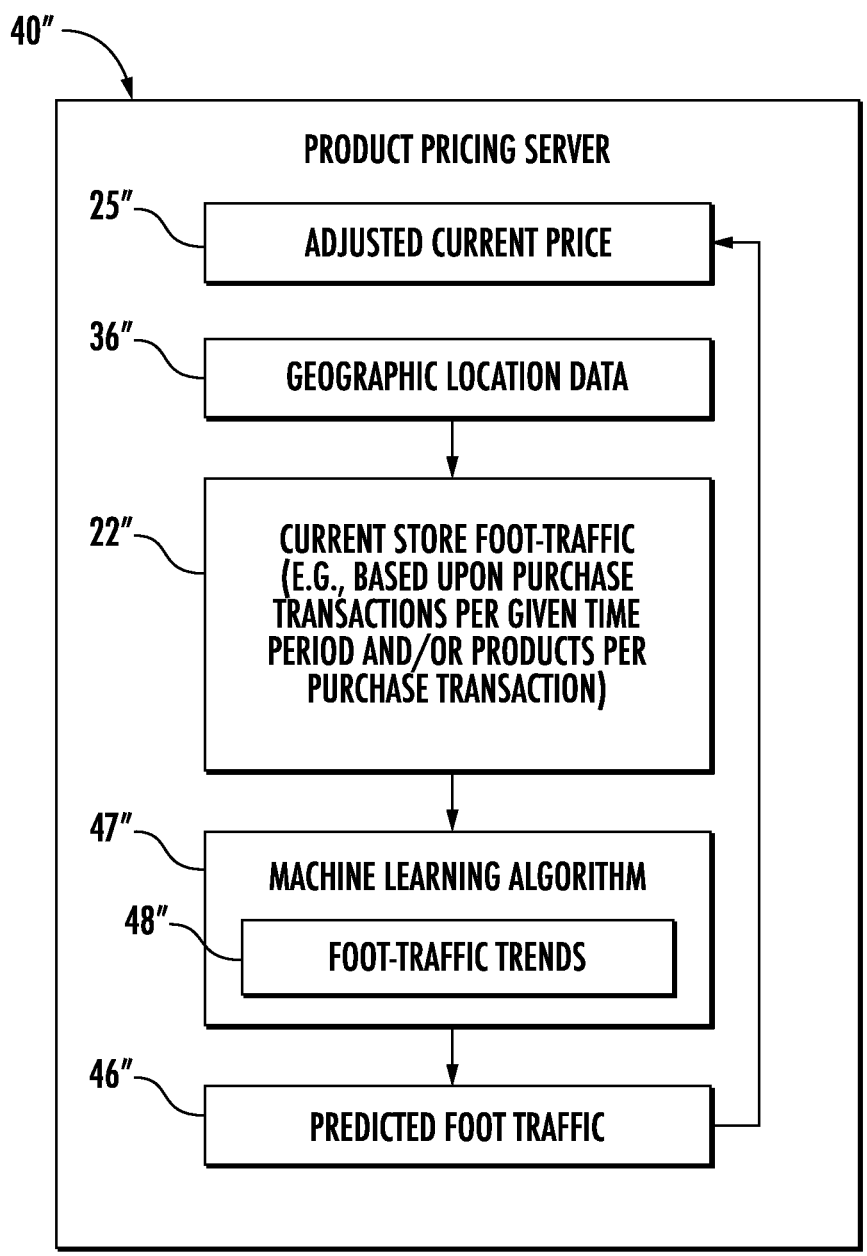
FIG. 7 is a schematic block diagram of a product pricing server in accordance with another embodiment.

Referring now to FIG. 7, in another embodiment, the product pricing server 40" adjusts the current price (adjusted current price 25") of the given product for purchase based upon predicted foot-traffic 46". More particularly, the product pricing server 40" operates a machine learning algorithm 47" that learns foot-traffic trends 48" and generates, as output therefrom, the predicted foot-traffic 46". The machine learning algorithm 47" may employ time series models. Those skilled in the art will appreciate that time series models accept, as input, data, such as current store foot-traffic 22" at different time intervals (e.g., every minute, hourly, etc.). The current store foot-traffic 22" may be determined as described above, for example, based upon the geographic location data 36". The time series models may include, autoregressive (AR), moving average (MA), ARMA, and ARIMA models. Of course, other models may be used to generate the predicted foot-traffic 46' '.

The product pricing server 40" adjusts the current price of the given product for purchase based upon the predicted foot-traffic 46". For example, the product pricing server 40" may increase the current price based upon an increase in predicted foot-traffic 46". Factors that may contribute to changes in predicted foot-traffic 46" and may thus be input to the machine learning algorithm 47" may include, for example, proximity to holidays, weather, season, and/or school calendar, for example. In contrast, the product pricing server 40" may decrease the current price based upon a decrease in predicted foot-traffic 46".

Figure 8:
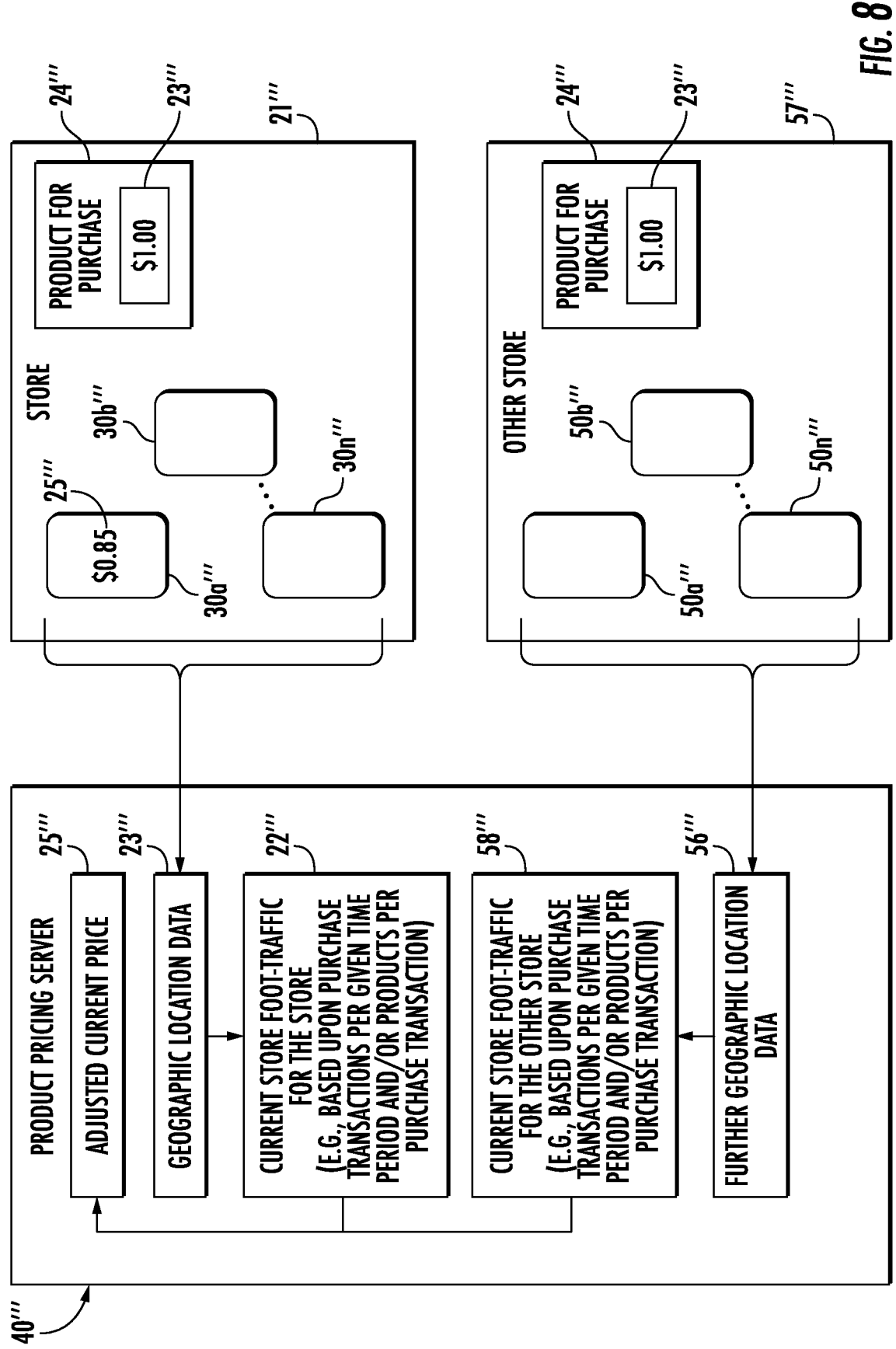
FIG. 8 is a schematic block diagram of a product pricing system in accordance with another embodiment.
Figure 9:
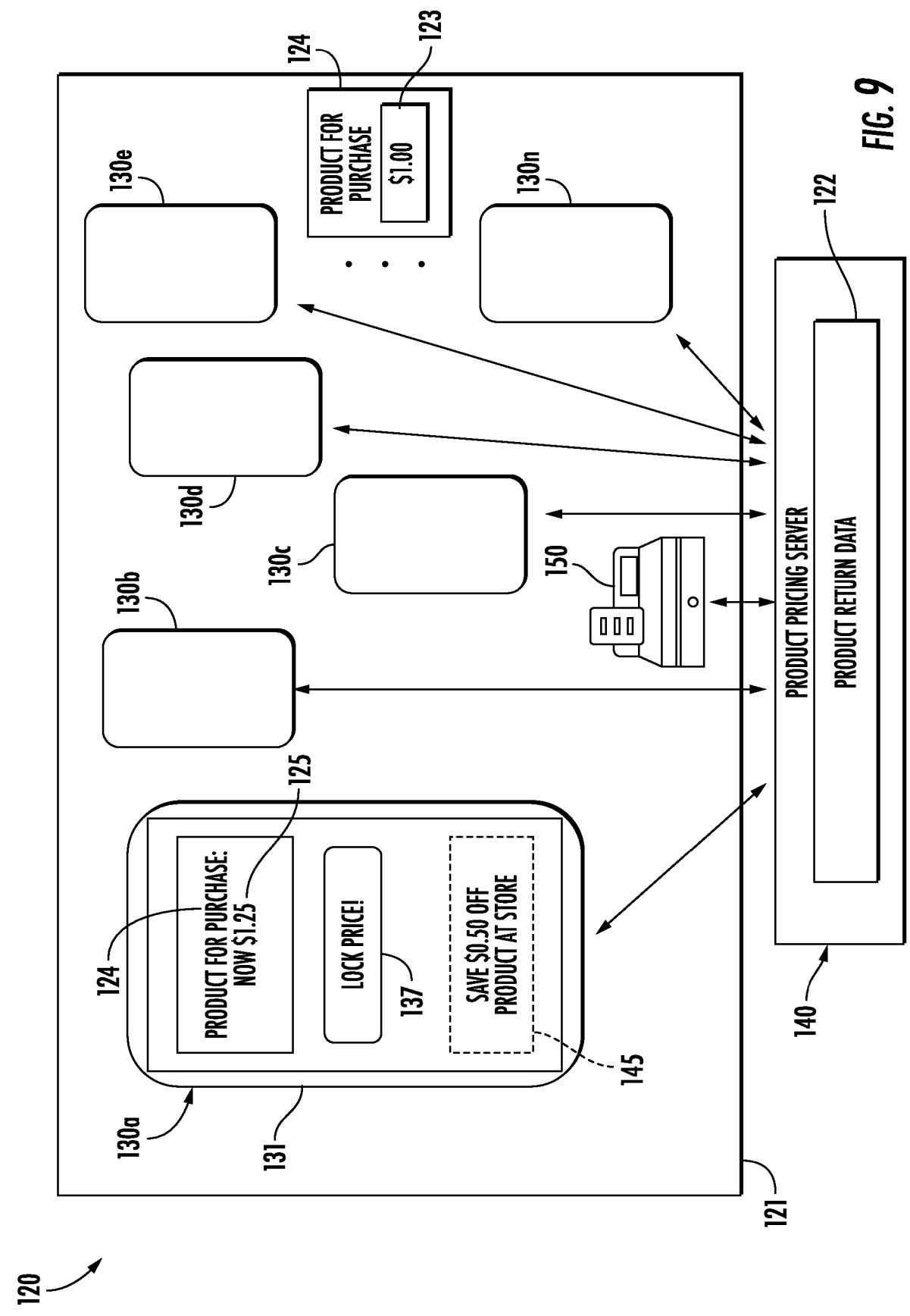
FIG. 9 is a schematic diagram of a product pricing system according to an embodiment.
Figure 10:
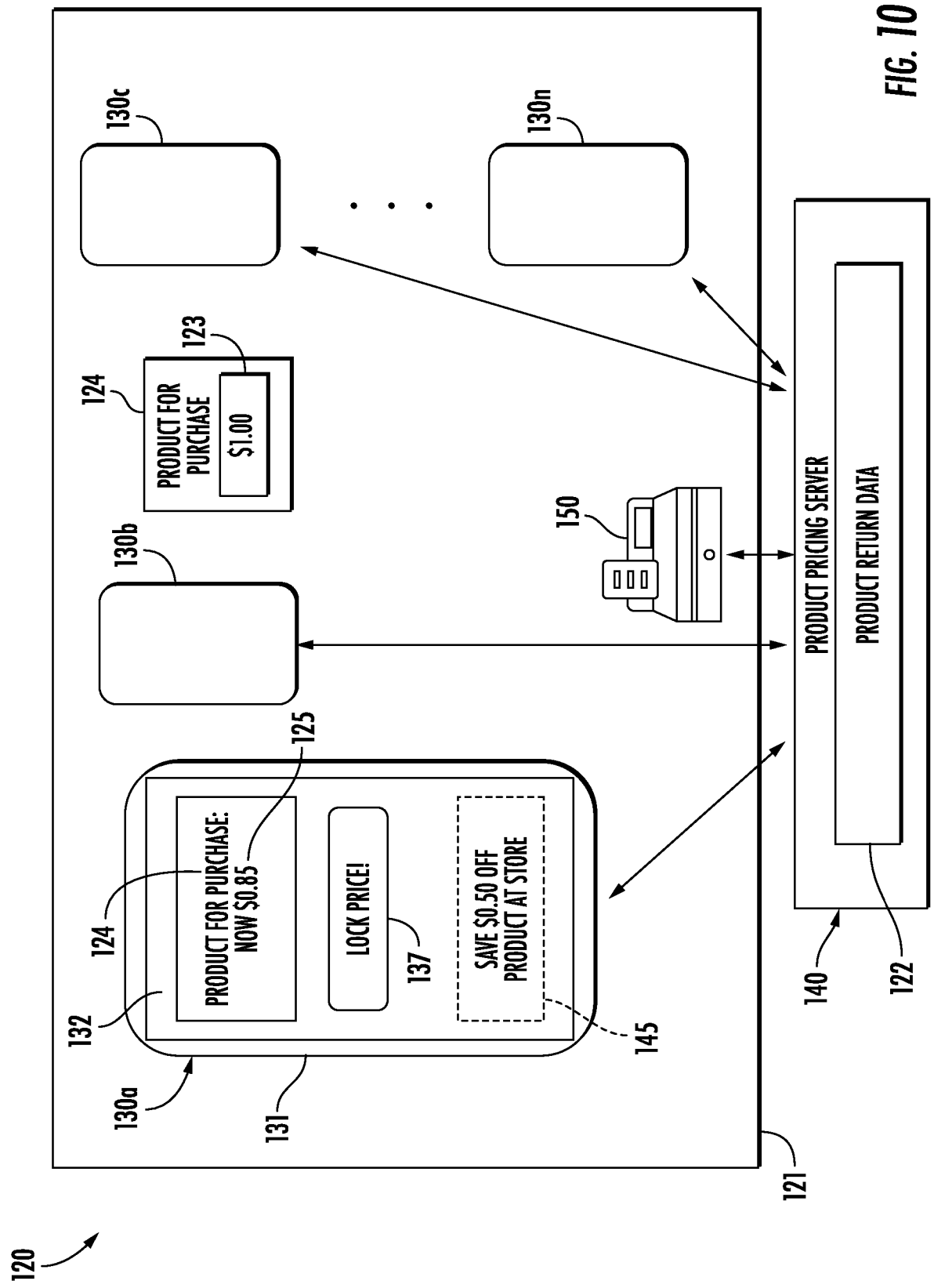
FIG. 10 is another schematic diagram of the product pricing system of FIG. 9.
Figure 11:
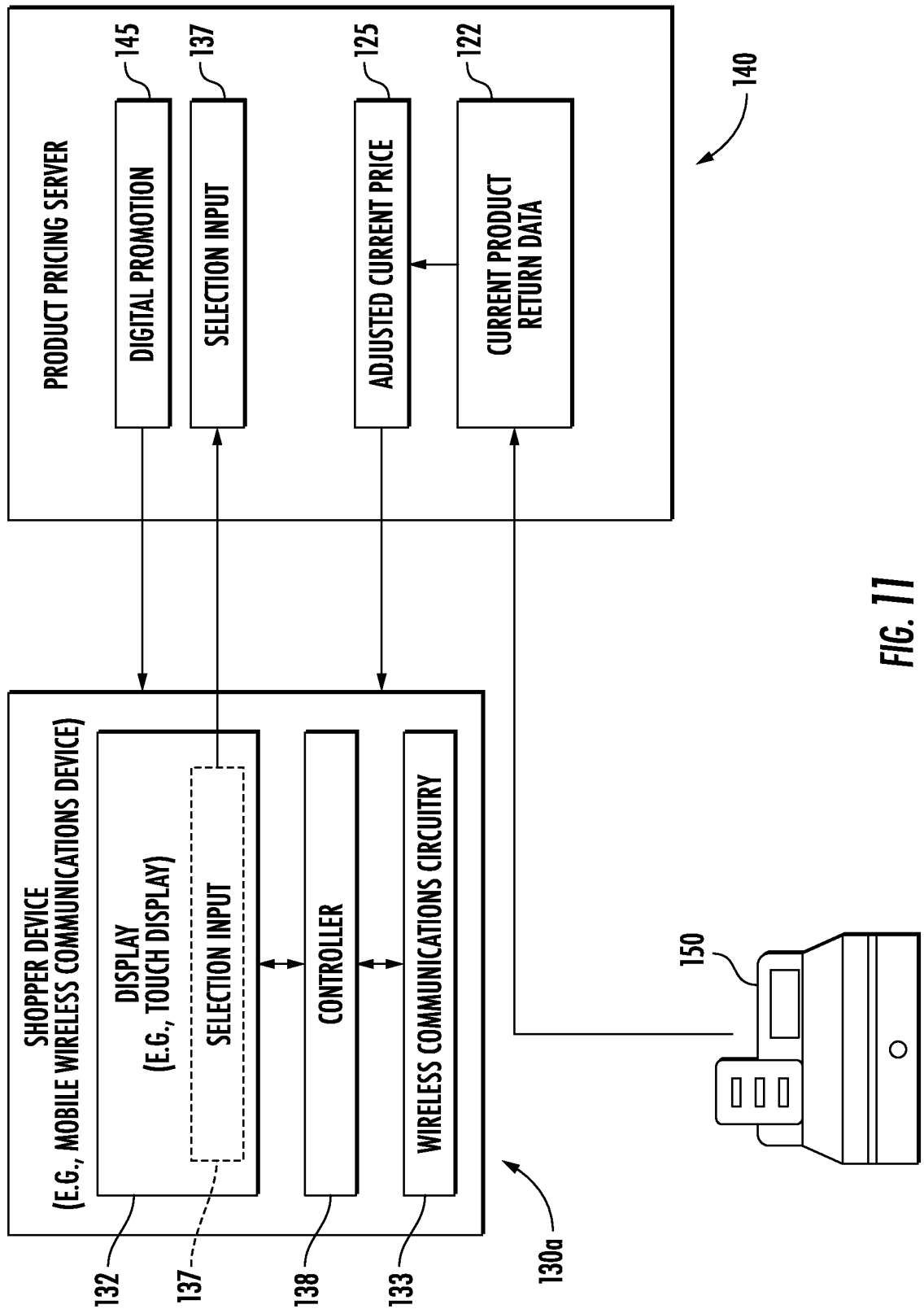
FIG. 11 is a schematic block operational diagram of the product pricing system of FIG. 9.
Figure 12:
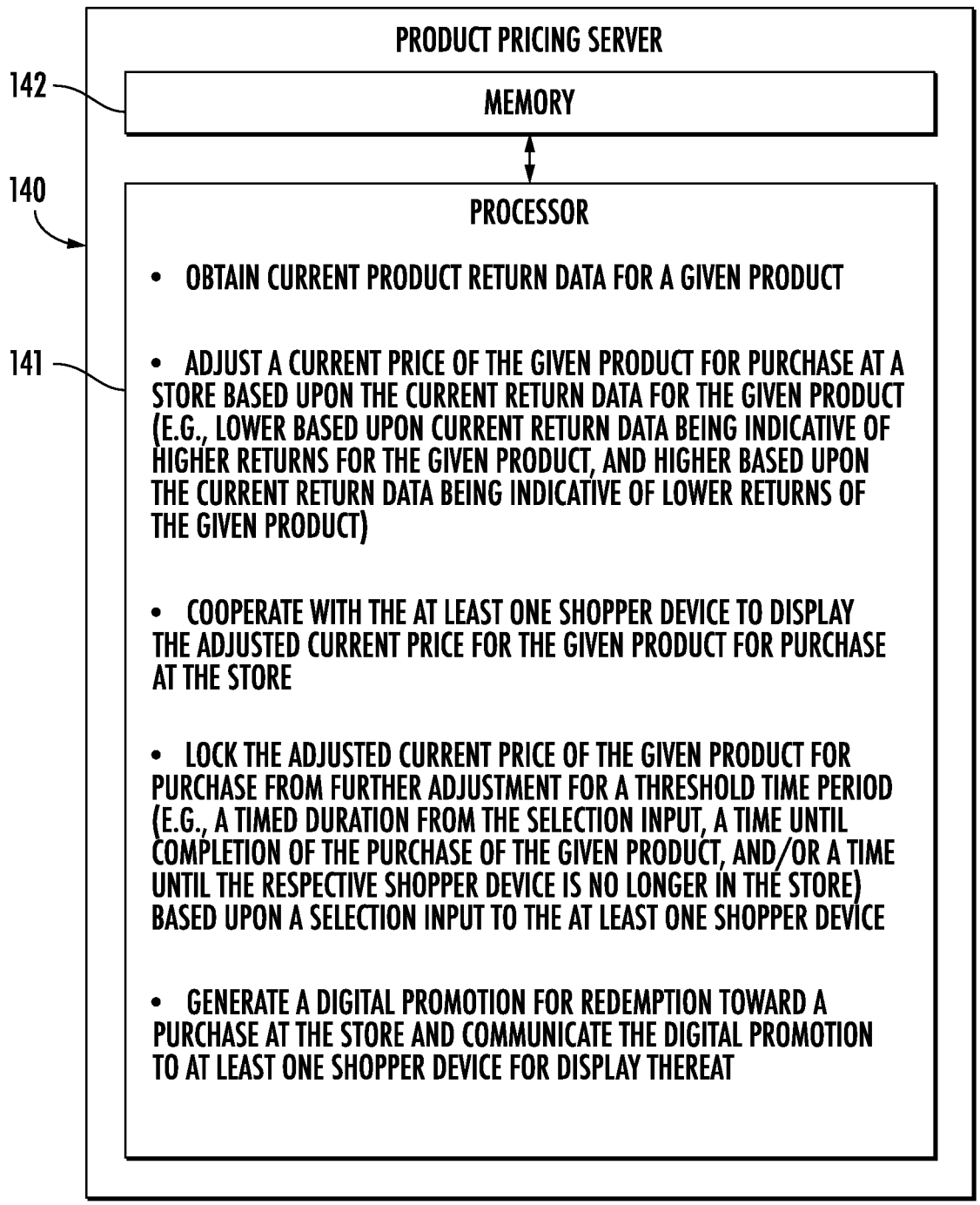
FIG. 12 is a schematic block diagram of the product pricing server of FIG. 11.

Referring now to FIG. 8 in another embodiment, the product pricing server 40''' may obtain further geographic location data 56''' from one or more other shopper devices 55a'''-55n'''. The further geographic location data 56''' may be obtained in addition to geographic location data 23''' obtained from the shopper devices 30a'''-30n''' at the store 21'''. The further geographic location data 56''' may be obtained using any one of more of the techniques described above. The other shopper devices 55a'''-55n''' may be located at another store 57''', for example. The other shopper devices 55a'''-55n''' may be located in more than one other store.

The product pricing server 40''' may determine current store foot-traffic 58''' associated with the other store 57''' based upon the further geographic location data 56''' and adjust the current price 23''' of the given product for purchase 24''' at the store 21''' based upon the current store foot-traffic 58''' associated with the other store 57''' or stores (e.g., in addition to the current store foot-traffic 22''' for the store 21'''). In other words, the product pricing server 40''' may use other stores' current foot-traffic 58''' as a basis for adjusting the current price 23''' of the given product for purchase 24''' at the first store 21'''. For example, in an exemplary implementation, the product pricing server 40''' may lower the current price 23''' of the product for purchase 24''' (adjusted current price 25''') in the store 21''' when the current foot-traffic 58''' for the other store 57''' is also lower (e.g., in addition to lower store traffic at the store 21'''). In some embodiments, the product pricing server 40''' may increase the current price 23''' of the product for purchase 24''' (adjusted current price 25''') in the store 21''' when the current foot-traffic 58''' for the other store 57''' is also lower, but the current foot-traffic 22''' in the store 21''' is higher.

As will be appreciated by those skilled in the art, the product pricing system 20 may advantageously drive foot traffic to or from a given store and/or at certain times. For example, shoppers may be driven to slower stores by lowering the prices of products at those stores while increasing the prices of those products (e.g., the same products) at the busier stores. The product pricing system 20 may also permit the retailer, for example, to normalize or control inventory levels by driving shoppers to certain products over other products. The product pricing system 20, by way of the price adjustment, may further permit geographic spacing of product inventories, for example, so that one store's product inventories are not out of balance relative to other stores' product inventories.

A method aspect is directed to a method of pricing a product. The method includes using a product pricing server 40 to obtain geographic location data 36 from at least one shopper device 30a-30n associated with a respective shopper and determine current store foot-traffic 22 associated with a store 21 at a given time based upon the geographic location data. The method also includes using the product pricing server 40 to adjust a current price 23 of a given product for purchase 24 at the store 21 based upon the current store foot-traffic 22 and cooperate with the at least one shopper device 30a-30n to display the adjusted current price 25 of the given product for purchase at the store. The method also includes using the product pricing server 40 to lock the adjusted current price 25 of the given product for purchase 24 from further adjustment for a threshold time period based upon a selection input 37 to the at least one shopper device 30a-30n.

A computer readable medium aspect is directed to a non-transitory computer readable medium for pricing a product. The non-transitory computer readable medium includes computer executable instructions that when executed by a processor 41 cause the processor to perform operations. The operations include obtaining geographic location data 36 from at least one shopper device 30a-30n associated with a respective shopper and determining current store foot-traffic 22 associated with a store 21 at a given time based upon the geographic location data. The operations also include adjusting a current price 23 of a given product for purchase 24 at the store 21 based upon the current store foot-traffic 22 and cooperating with the at least one shopper device 30a-30n to display the adjusted current price 25 of the given product for purchase at the store. The operations further include locking the adjusted current price 25 of the given product for purchase 24 from further adjustment for a threshold time period based upon a selection input 37 to the at least one shopper device 30a-30n.

Referring now to FIGS. 9-12, a product pricing system 120 includes shopper devices 130a-130n. Each shopper device 130a-130n is associated with a respective shopper. The shopper devices 130a-130n are illustratively in the form of a mobile wireless communications device, and, more particularly, a mobile or smart phone. One or more of the shopper devices 130a-130n may be a different type of wireless communications device, for example, a wearable device, a tablet computer, or a laptop computer.

Each shopper device 130a-130n may include a display 132 carried by a housing 131. The display 132 may be in the form of a touch display, for example, that, while displaying information, accepts user input. Each shopper device 130a-130n may also include wireless communications circuitry 133 carried by the housing 131. The wireless communications circuitry 133 may include one or more of long-range wireless communications circuitry (e.g., cellular, satellite or global positioning system (GPS)), medium-range wireless communications circuitry (e.g., WiFi, Bluetooth), and/or short-range wireless communications circuitry (e.g., near-field communications (NFC)). A controller 138 may cooperate with the display 132 and the wireless communications circuitry 133 to perform display and wireless communications functions, respectively.

The product pricing system 120 also includes a product pricing server 140. The product pricing server 140 includes a processor 141 and an associated memory 142. The operations of the product pricing server 140 are described herein, the processor 141 and the memory 142 cooperate to perform the operations.

Figure 13:
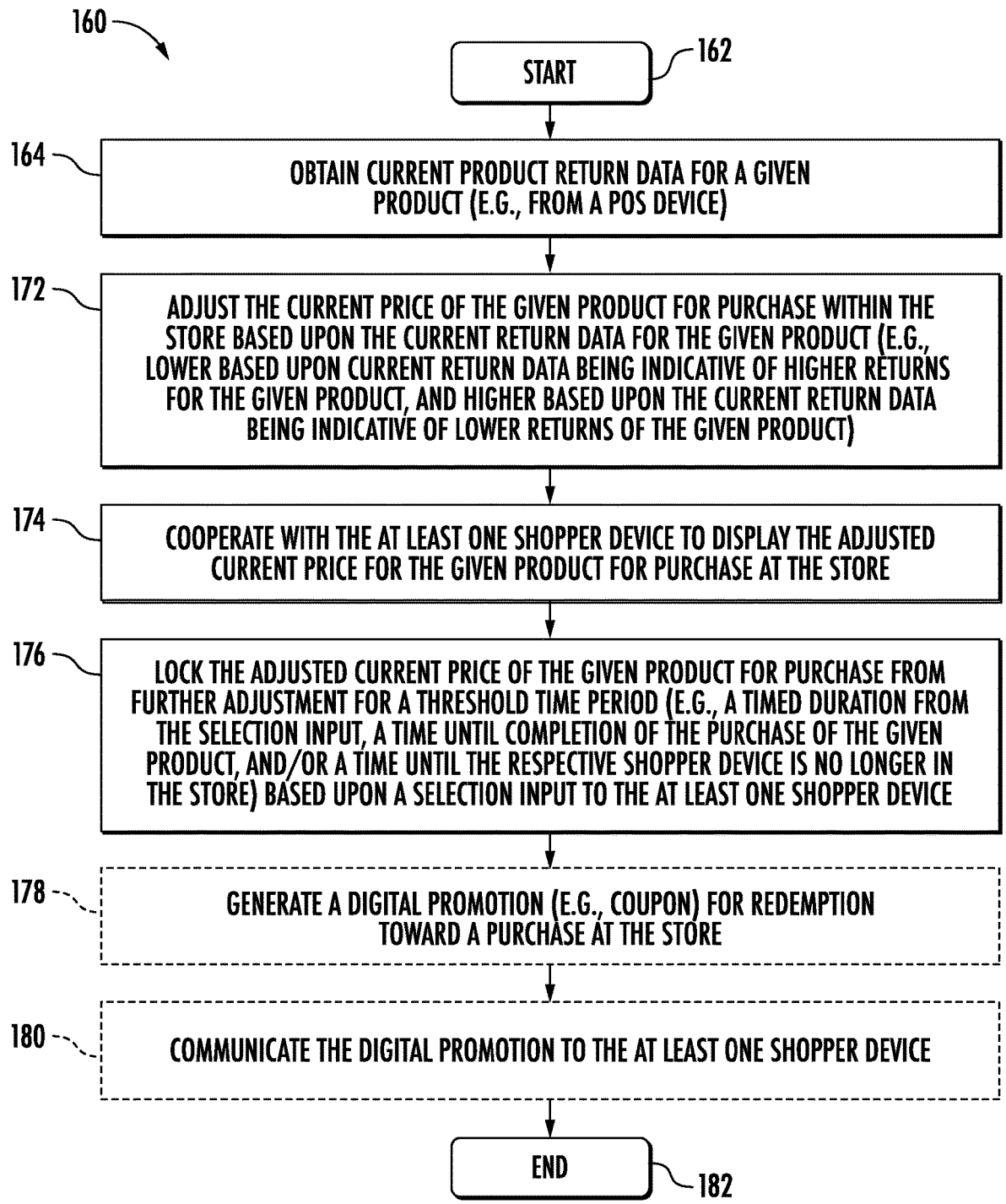
FIG. 13 is a flow diagram illustrating operation of the product pricing server of FIG. 12.

Referring now additionally to the flowchart 160 in FIG. 13, beginning at Block 162, operations of the product pricing server 140 will now be described. At Block 164, the product pricing server 140 obtains current product return data 122. The product pricing server 140 may obtain the product return data 122 from a remote server or database, which may be stored in the memory 142. The current product return data 122 may include data indicative of quantities of products, including the given product 124, purchased and returned, respective dates, respective locations, and purchase prices, for example. The product return data 122 may include other and/or additional data.

The product return data 122 may be obtained by the product pricing server 140 at predetermined intervals, for example, every few minutes, hours, or days. The product return data 122 may be obtained in real time, randomly, or at variable rates, for example, when changes in product return data are likely (e.g., post holiday).

At Block 172, the product pricing server 140 adjusts a current price 123 of the given product for purchase 124 at the store 121 based upon the current product return data 122. The product pricing server 140 may adjust the current price 123 of the given product for purchase 124 lower based the current product return data 122 representative of a higher number of returns. The product pricing server 140 may adjust the current price 123 of the given product for purchase 124 higher based upon current product return data 122 representative of a lower number of returns. For example, a given product for purchase 124 has a current price 123 of $1.00. During periods where the current product return data 122 represents a lower number of returns, the product pricing server 140 may increase the current price 123 to an adjusted price 125 of $1.25 (FIG. 9), for example. During periods where current return product return data 122 represents a higher number of returns, the product pricing server 140 may decrease the current price 123 to an adjusted price 125 of $0.85 (FIG. 10), for example. The amount of the increase or decrease in the current price 123 may be dependent on the current product return data 122, for example, how often the given product for purchase 124 is returned relative to or measured in deviations from average or normalized product returns represented by the product return data.

The product pricing server 140, at Block 174, cooperates with one or more of the shopper devices 130a-130n to display, for example, on the display 132, the adjusted current price 125 of the given product for purchase 124. The adjusted current price 125 may be communicated via an application executed on a given shopper device 130a-130n, for example, and associated with the store. The given product for purchase 124 may be a promoted product for purchase, for example, a product the shopper has previously purchased, or a product the shopper has saved to a list (e.g., in the application associated with the store).

In some embodiments, beacon technologies, for example, using NFC, may permit the product pricing server 140 to determine when a given shopper, via the respective shopper device 130a-130n is in proximity to the given product for purchase 124, and cooperate to display the adjusted current price 125 based upon the detected proximity. In an embodiment, the shopper may, for example, via the application, scan the given product for purchase 124 for purposes of a price-check or adding to a virtual cart for use in a self-checkout process, for example. The product pricing server 140 may thus cooperate the respective shopper device 130a-130n to display the adjusted current price 125 thereat, for example, based upon the scanning or price checking.

The product pricing server 140, may cooperate with the shopper devices 130a-130n to display, on the display 132, along with the adjusted current price 125, a selection input 137. The selection input 137 may, upon activation or touch thereto, be indicative of the shopper's desire to purchase the given product for purchase 124 at the adjusted current price 125. The selection input 137 may add the given product for purchase 124 to a virtual shopping cart for self-checkout, or may lock the adjusted current price. For example, if the adjusted current price 125 is lower, it may be desirable to lock the lower price. Alternatively, if the adjusted current price 125 is higher, it may also be desirable to lock the higher price to prevent additional price increases. Locking the adjusted current price 125 is described in further detail below.

At Block 176, the product pricing server, for example, in response to the selection input 137, locks the adjusted current price 125 from further pricing adjustment for a threshold time period. The threshold time period may include a timed duration from the selection input 137 to the respective shopper device 130a-130n. For example, a given shopper may have 15-minutes from the selection input 137 until the locked adjusted current price 125 unlocks. The threshold time period may include a time until completion of the purchase of the given product 124 at a POS device 150 at the store 121. For example, the given shopper may have 15-minutes from the selection input 137 to the respective shopper device or may be given a time of day by which to complete the purchase of the given product 124 (e.g., by processing payment at the POS device 150 in the store 121) until the locked adjusted price 125 unlocks. Alternatively or additionally, the threshold time period may include a time until the respective shopper device 130a-130n is no longer in the store 121, for example, using one of the techniques described above. In other words, once the given shopper leaves the store 121, the locked adjusted current price 125 may be unlocked.

The product pricing server 140 may generate a digital promotion 145 (Block 178). The digital promotion 145 may be a digital coupon, for example, and be redeemable toward a purchase at the store 121. The digital promotion 145 may be redeemable toward a specific product for purchase or brand of product, which may or may not be the same product and/or brand as the given product for purchase 124 having the adjusted current price 125 locked. The digital promotion 145 may be redeemable, for example, toward a purchase of a competitor branded product to the given product for purchase 124. At Block 180, the product pricing server 140 communicates the digital promotion 145 to one or more of the shopper devices 130a-130n. The product pricing server 140 may generate and communicate the digital promotion 145 based upon the selection input 127 so that shoppers who have locked an adjusted current price 125 receive the digital promotion. In some embodiments, the product pricing server 140 may generate and communicate the digital promotion 145 regardless the selection input 137 so that shoppers may receive a digital promotion even if they did not lock the adjusted current price 125. In some embodiments, the product pricing server 140 may generate and communicate the digital promotion 145 based upon display of the adjusted current price 125. For example, if the adjusted current price 125 is displayed, but no selection input 137 is received (e.g., within a threshold time period), the product pricing server 140 may generate and communicate the digital promotion 145. Operations end at Block 182.

Figure 14:
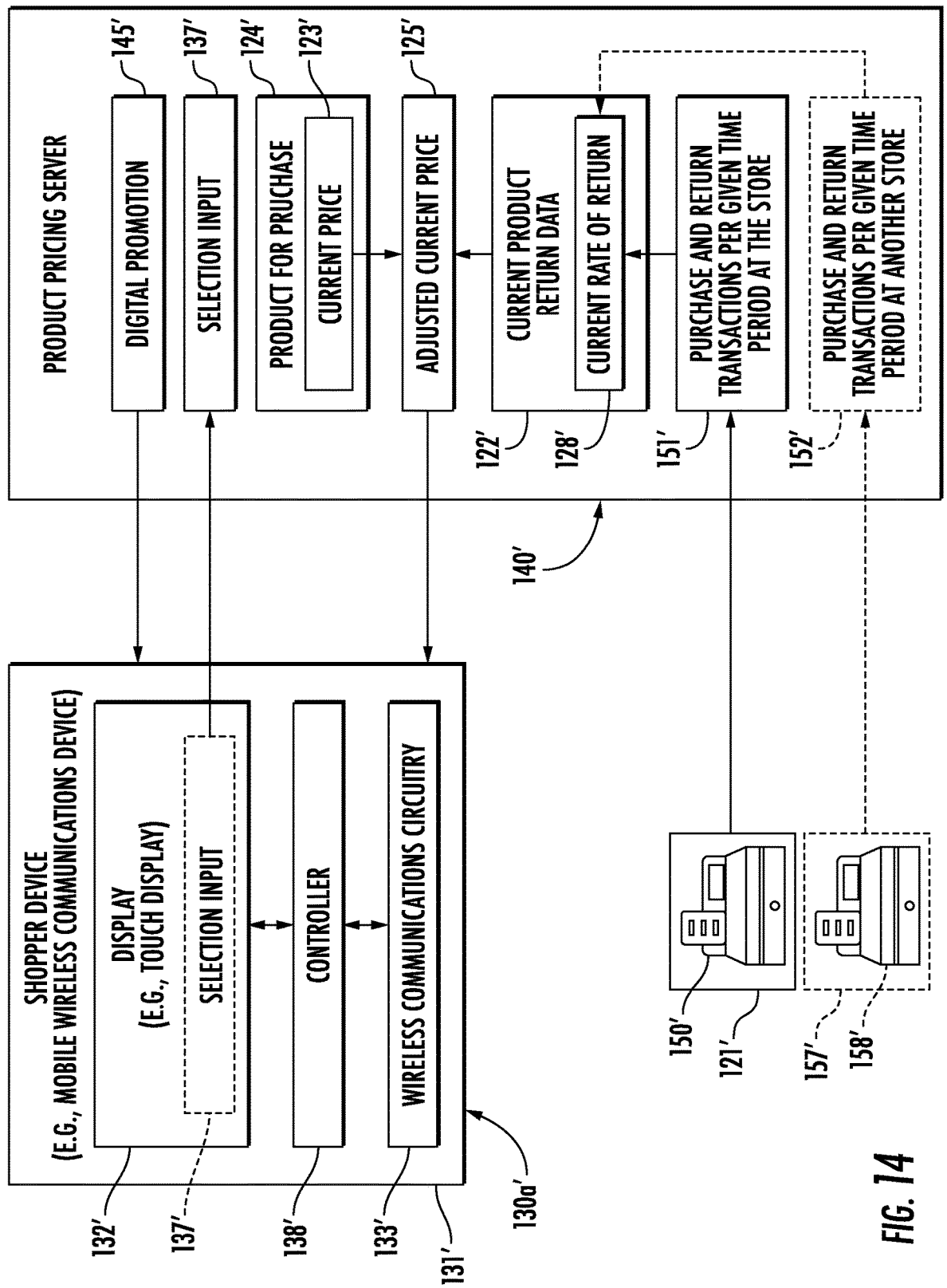
FIG. 14 is a schematic diagram of a product pricing system in accordance with another embodiment.
Figure 15:
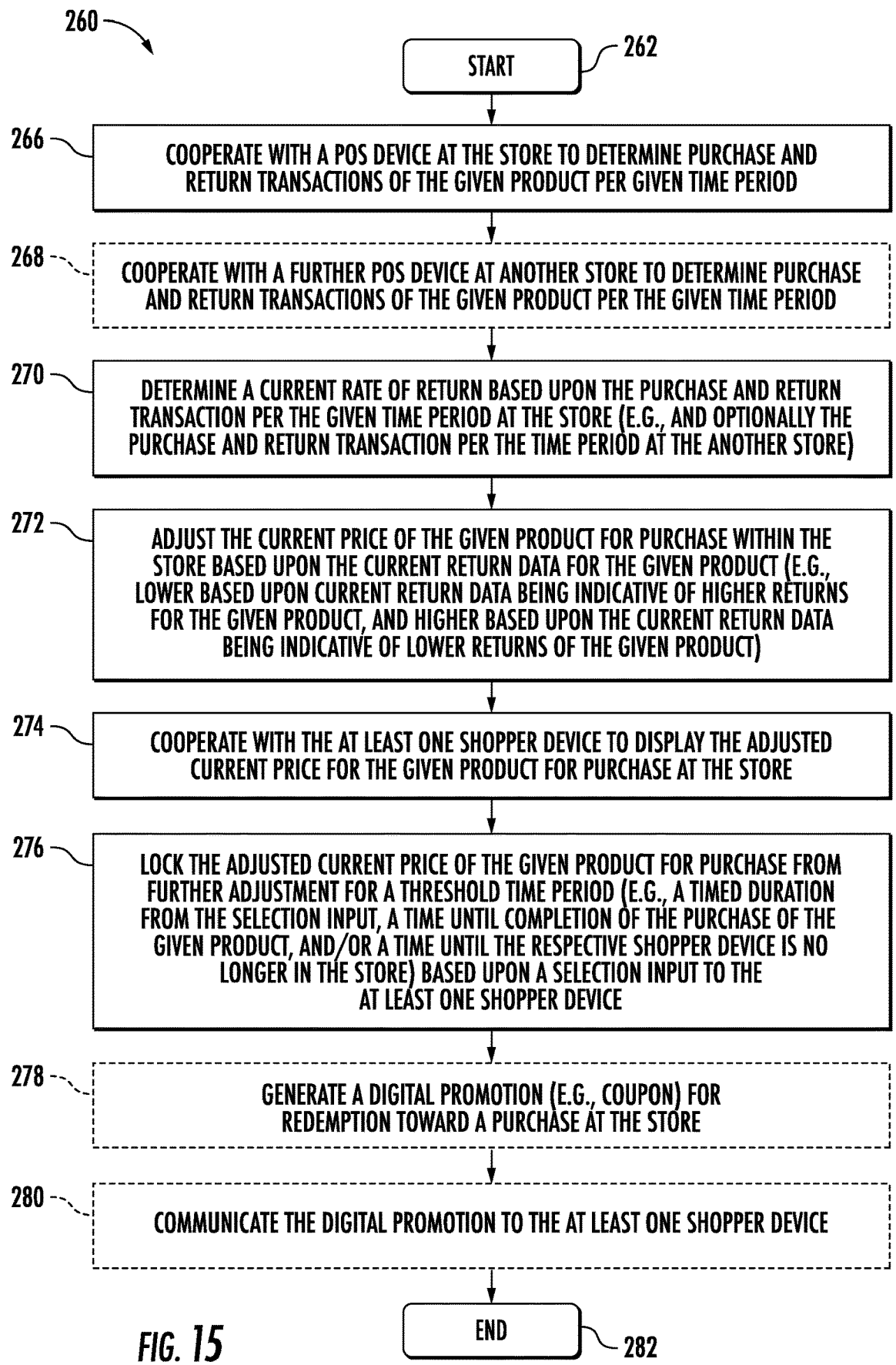
FIG. 15 is a flow diagram of operation of the product pricing server of FIG. 14.

Referring now to FIG. 14 and the flowchart 260 in FIG. 15, beginning at Block 262, operations of the product pricing server 140' according to another embodiment will now be described. The product pricing server 140' obtains the current product return data 122' for determining a current rate of return 128' for the given product for purchase 124'.

The product pricing server 140' cooperates with a point-of-sale (POS) device 150' within or at the store 121' to obtain and determine purchase and return transactions of the given product 124' per given time period 151' (Block 266). The product pricing server 140' may receive transaction data from the POS device 150', for example, as purchase and/or return transactions are being processed. The product pricing server 140' may count the number of the purchase and return transactions in a given day, for example. For example, three given products 124' may have been returned while thirty given products may have been purchased in that day.

The product pricing server 140' may optionally, cooperate with one or more further POS devices 158" at another store 157' to determine the purchase and return transactions of the given product for purchase per the given time period at the another store 152' (Block 268). Techniques for determining the given product for purchase per the given time period 151' based upon POS devices 158' at another store 157' are similar to those described above. Accordingly, the current rate of return 128' for the given product for purchase 124' may be determined across multiple stores 121', 157', for example, and/or for a same given time period.

At Block 270, the product pricing server 140' determines the current rate of return based upon the purchase and return transactions per the given time period 151', 152' at the store 121' and, optionally, at one or more other stores 157'. For the above example, the current rate of return 128' per the given time period would be 10%. A higher current rate of return 128' may be indicative that the given product 124' may be subject to defects, for example, product and/or packaging, or some other defect, and/or that shoppers have a general feeling toward the product that rises to a level to cause the shopper to return the given product. Contrastingly, a lower current rate of return 128' may be indicative that the given product 124' may be subject to less defects and that shoppers have a generally positive feeling toward the given product (i.e., shopper like it).

The product pricing server 140' cooperates with the shopper device 130$a$' to display the adjusted current price 125' of the given product for purchase 124' at the store 121' (Block 274). The product pricing server 140' locks the adjusted current price 125' of the given product for purchase 124' from further adjustment for a threshold time period based upon a selection input 137' to the shopper device 130$a$' (Block 276).

The threshold time period may include a timed duration from the selection input 137' to the given shopper device 130$a$, a time until completion of the purchase of the given product 124' at a POS device 150' at the store 121', and/or a time until the respective shopper device 130$a$' is no longer in the store 121', for example, as described above. The product pricing server 140' may generate a digital promotion 145' (Block 278) and communicate the digital promotion (Block 280), for example, as described above.

Elements illustrated, but not specifically described are similar to those described above, including the current price 123', the display 132', the controller 138', the wireless communications circuitry 133', the display 131'. Operations end at Block 282.

Figure 16:
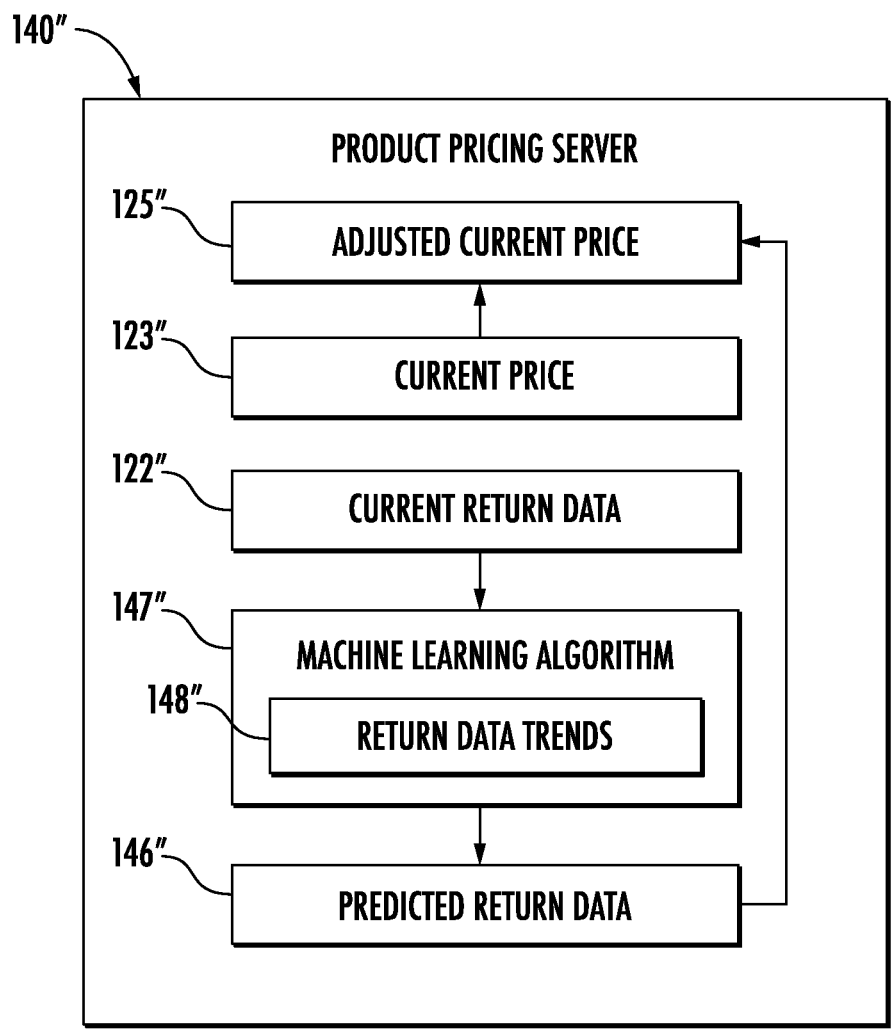
FIG. 16 is a schematic block diagram of a product pricing server in accordance with another embodiment.

Referring now to FIG. 16, in another embodiment, the product pricing server 140" adjusts the current price 123" of the given product based upon predicted return data 146". More particularly, the product pricing server 140" operates a machine learning algorithm 147" that learns return data trends 148" and generates, as output therefrom, the predicted return data 146". Similar to the embodiments above, the machine learning algorithm 147" may employ time series models. Those skilled in the art will appreciate that time series models accept, as input, data, such as current return data 122" at different time intervals (e.g., every minute, hourly, etc.). The time series models may include, autoregressive (AR), moving average (MA), ARMA, and ARIMA models. Of course, other models may be used to generate the predicted return data 146".

The product pricing server 140" adjusts the current price 123" (adjusted current price 125" of the given product based upon the predicted foot-traffic 146". For example, the product pricing server 140" may decrease the current price 123" based upon predicted return data 146" being indicative of a higher amount or a higher rate of returns. Factors that may contribute to changes in predicted return data 146" and may thus be input to the machine learning algorithm 147" may include, for example, proximity to holidays and economic factors, for example. In contrast, the product pricing server 140" may increase the current price based upon predicted return data 146" being indicative of a lower amount of returns or a lower rate of returns.

A method aspect is directed to method of pricing a given product 124. The method includes using a product pricing server 140 to obtain current product return data 122 for the given product 124 and adjust a current price 123 of the given product for purchase at a store 121 based upon the current return data for the given product. The method further includes using the product pricing server 140 to cooperate with at least one shopper device 130$a$-130$n$ associated with a respective shopper to display the adjusted current price 125 of the given product for purchase 124 at the store 121. The method further includes using the product pricing server 140 to lock the adjusted current price 125 of the given product for purchase 124 from further adjustment for a threshold time period based upon a selection input 137 to the at least one shopper device 130$a$-130$n$.

A computer readable medium aspect is directed to a non-transitory computer readable medium for pricing a given product 124. The non-transitory computer readable medium for pricing a given product includes computer executable instructions that when executed by a processor 141 cause the processor to perform operations. The operations include obtaining current product return data 122 for the given product 124 and adjusting a current price 123 of the given product for purchase at a store based upon the current return data for the given product. The operations also include cooperating with at least one shopper device 130$a$-130$n$ associated with a respective shopper to display the adjusted current price 125 of the given product for purchase 124 at the store 121. The operations also include locking the adjusted current price 125 of the given product for purchase 124 from further adjustment for a threshold time period based upon a selection input 137 to the at least one shopper device 130$a$-130$n$.

While several embodiments have been described herein, it should be appreciated by those skilled in the art that any element or elements from one or more embodiments may be used with any other element or elements from any other embodiment or embodiments. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A product pricing system comprising:
at least one shopper device associated with a respective shopper;
a network access point in a store;
a point-of-sale (POS) device at the store; and
a product pricing server configured to
cooperate with the POS device to determine a number of products per purchase transaction at the store,
obtain global positioning system (GPS) coordinate data from the at least one shopper device,
determine current store foot-traffic associated with the store at a given time based upon the GPS coordinate data being indicative of the respective shopper being within a threshold distance from the store followed by communication between the at least one shopper device and the network access point in the store, and based upon the number of products per purchase transaction,
adjust a current price of a given product for purchase at the store based upon the current store foot-traffic,
cooperate with the at least one shopper device to display the adjusted current price of the given product for purchase at the store and display, on the at least one shopper device, a selection input prompting for the respective shopper to accept the adjusted current price, and
lock the adjusted current price of the given product for purchase from further adjustment for a threshold time period upon activation of the selection input to the at least one shopper device.

2. The product pricing system of claim 1 wherein the product pricing server is configured to generate a digital promotion for redemption toward a purchase at the store and communicate the digital promotion to the at least one shopper device for display thereat.

3. The product pricing system of claim 1 wherein the threshold time period comprises at least one of a timed duration from the selection input to the at least one shopper device, a time until completion of purchase of the given product at the POS device at the store, and a time until the at least one shopper device is no longer in the store.

4. The product pricing system of claim 1 wherein the product pricing server is configured to cooperate with the POS device at the store to determine purchase transactions per given time period at the store, and determine the current store foot-traffic based upon the purchase transactions per given time period.

5. The product pricing system of claim 1 wherein the product pricing server is configured to adjust the current price of the given product higher based upon a higher current store foot-traffic, and adjust the current price of the given product lower based upon a lower current store foot-traffic.

6. The product pricing system of claim 1 wherein the product pricing server is configured to:
operate a machine learning algorithm that learns foot-traffic trends and generates as output therefrom, predicted foot-traffic; and
adjust the current price of the given product based upon the predicted foot-traffic.

7. The product pricing system of claim 1 wherein the at least one shopper device comprises a plurality of shopper devices each associated with a respective shopper; and wherein the product pricing server is configured to obtain GPS coordinate data from each of the plurality of shopper devices, and determine the current store-traffic based upon the GPS coordinate data from each of the plurality of shopper devices.

8. The product pricing system of claim 1 wherein the product pricing server is configured to:
obtain further GPS coordinate data from at least one other shopper device;
determine current store foot-traffic associated with another store based upon the further GPS coordinate data being indicative of the respective shopper being in a further threshold distance from the another store followed by communication between the at least one other shopper device and a network access point in the another store; and
adjust the current price of the given product for purchase at the store based upon the current store foot-traffic associated with the another store.

9. A product pricing server comprising:
a processor and an associated memory configured to
cooperate with a point-of-sale (POS) device at a store to determine a number of products per purchase transaction at the store,
obtain global positioning system (GPS) coordinate data from at least one shopper device associated with a respective shopper,
determine current store foot-traffic associated with the store at a given time based upon the GPS coordinate data being indicative of the respective shopper being within a threshold distance from the store followed by communication between the at least one shopper device and a network access point in the store, and based upon the number of products per purchase transaction,
adjust a current price of a given product for purchase at the store based upon the current store foot-traffic,
cooperate with the at least one shopper device to display the adjusted current price of the given product for purchase at the store and display, on the at least one shopper device, a selection input prompting for the respective shopper to accept the adjusted current price, and
lock the adjusted current price of the given product for purchase from further adjustment for a threshold time period upon activation of the selection input to the at least one shopper device.

10. The product pricing server of claim 9 wherein the processor is configured to generate a digital promotion for redemption toward a purchase at the store and communicate the digital promotion to the at least one shopper device for display thereat.

11. The product pricing server of claim 9 wherein the threshold time period comprises at least one of a timed duration from the selection input to the at least one shopper device, a time until completion of purchase of the given product at the POS device at the store, and a time until the at least one shopper device is no longer in the store.

12. The product pricing server of claim 9 wherein the product pricing server is configured to cooperate with the POS device at the store to determine purchase transactions per given time period at the store, and determine the current store foot-traffic based upon the purchase transactions per given time period.

13. A method of pricing a product, the method comprising:
using a product pricing server to cooperate with a point-of-sale (POS) device at a store to determine a number of products per purchase transaction at the store, obtain global positioning system (GPS) coordinate data from at least one shopper device associated with a respective shopper, determine current store foot-traffic associated with the store at a given time based upon the GPS coordinate data being indicative of the respective shopper being within a threshold distance from the store followed by communication between the at least one shopper device and a network access point in the store, and based upon the number of products per purchase transaction, adjust a current price of a given product for purchase at the store based upon the current store foot-traffic, cooperate with the at least one shopper device to display the adjusted current price of the given product for purchase at the store and display, on the at least one shopper device, a selection input prompting for the respective shopper to accept the adjusted current price, and lock the adjusted current price of the given product for purchase from further adjustment for a threshold time period upon activation of the selection input to the at least one shopper device.

14. The method of claim 13 wherein using the product pricing server comprises using the product pricing server to generate a digital promotion for redemption toward a purchase at the store and communicate the digital promotion to the at least one shopper device for display thereat.

15. The method of claim 13 wherein the threshold time period comprises at least one of a timed duration from the selection input to the at least one shopper device, a time until completion of purchase of the given product at the POS device at the store, and a time until the at least one shopper device is no longer in the store.

16. The method of claim 13 wherein the product pricing server is configured to cooperate with the POS device at the store to determine purchase transactions per given time period at the store, and determine the current store foot-traffic based upon the purchase transactions per given time period.

17. A non-transitory computer readable medium for pricing a product, the non-transitory computer readable medium comprising computer executable instructions that when executed by a processor cause the processor to perform operations comprising:

cooperating with a point-of-sale (POS) device at a store to determine a number of products per purchase transaction at the store, obtaining global positioning system (GPS) coordinate data from at least one shopper device associated with a respective shopper;

determining current store foot-traffic associated with the store at a given time based upon the GPS coordinate data being indicative of the respective shopper being within a threshold distance from the store followed by communication between the at least one shopper device and a network access point in the store, and based upon the number of products per purchase transaction;

adjusting a current price of a given product for purchase at the store based upon the current store foot-traffic;

cooperating with the at least one shopper device to display the adjusted current price of the given product for purchase at the store, and display, on the at least one shopper device, a selection input prompting for the respective shopper to accept the adjusted current price; and locking the adjusted current price of the given product for purchase from further adjustment for a threshold time period upon activation of the selection input to the at least one shopper device.

18. The non-transitory computer readable medium of claim 17 wherein the operations comprise generating a digital promotion for redemption toward a purchase at the store and communicate the digital promotion to the at least one shopper device for display thereat.

19. The non-transitory computer readable medium of claim 17 wherein the threshold time period comprises at least one of a timed duration from the selection input to the at least one shopper device, a time until completion of purchase of the given product at a point-of-sale-(POS) the POS device at the store, and a time until the at least one shopper device is no longer in the store.

20. The non-transitory computer readable medium of claim 17 wherein the operations comprise cooperating with the POS device at the store to determine purchase transactions per given time period at the store, and determining the current store foot-traffic based upon the purchase transactions per given time period.

* * * * *

UNITED STATES PATENT AND TRADEMARK OFFICE
CERTIFICATE OF CORRECTION

PATENT NO. : 12,462,269 B1
APPLICATION NO. : 18/444582
DATED : November 4, 2025
INVENTOR(S) : Lingelbach et al.

Page 1 of 1

It is certified that error appears in the above-identified patent and that said Letters Patent is hereby corrected as shown below:

In the Claims

Column 18, Line 37   Delete: "a point-of-sale-(POS)"

Signed and Sealed this
Ninth Day of December, 2025

John A. Squires
*Director of the United States Patent and Trademark Office*